US010601759B2

(12) United States Patent
Peterson et al.

(10) Patent No.: US 10,601,759 B2
(45) Date of Patent: *Mar. 24, 2020

(54) SYSTEMS, APPARATUS AND METHODS FOR FACILITATING MULTIPLE LEVELS OF DETAIL OF DISPLAY BASED ON RECEIPT OF MESSAGING AND MANAGEMENT OF INFORMATION FOR COMMUNICATION DEVICES

(71) Applicant: AT&T Mobility II LLC, Atlanta, GA (US)

(72) Inventors: Jared S. Peterson, Herndon, VA (US); Janna Ducich, Atlanta, GA (US); Kristin Marie Pascal, Kirkland, WA (US); Edward Woodbery, Issaquah, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/294,997

(22) Filed: Oct. 17, 2016

(65) Prior Publication Data

US 2017/0031564 A1    Feb. 2, 2017

Related U.S. Application Data

(63) Continuation of application No. 14/795,580, filed on Jul. 9, 2015, now Pat. No. 9,503,403, which is a
(Continued)

(51) Int. Cl.
*H04L 12/58* (2006.01)
*H04L 29/08* (2006.01)
*H04L 29/06* (2006.01)

(52) U.S. Cl.
CPC ............ *H04L 51/32* (2013.01); *H04L 51/043* (2013.01); *H04L 51/046* (2013.01);
(Continued)

(58) Field of Classification Search
CPC .......... H04M 2250/60; H04M 1/27455; G06F 2203/04803; G06F 3/04817; G06F 3/0482;
(Continued)

(56) References Cited

U.S. PATENT DOCUMENTS

2003/0046421 A1* 3/2003 Horvitz ................ G06Q 10/107
709/238
2007/0082707 A1 4/2007 Flynt et al.
(Continued)

OTHER PUBLICATIONS

Office Action dated Nov. 20, 2012 for U.S. Appl. No. 12/966,204, 41 pages.
(Continued)

*Primary Examiner* — Lance Leonard Barry
(74) *Attorney, Agent, or Firm* — Amin, Turocy & Watson, LLP

(57) ABSTRACT

Information management and display is enabled. A method can include displaying, via a user interface of a communication device, a dynamically updatable wallpaper comprising a personalized theme personalized to a user of the communication device. The method can also include updating the dynamically updatable wallpaper to display one or more animated icons. Displaying the animated icons can be based, at least, on detected activity of respective contacts associated with the one or more animated icons. An apparatus can comprise a user interface component configured to display images indicative of contacts. The apparatus can also include a messaging component configured to: integrate different types of text messages for one of the contacts; and provide concurrent display of the text messages and social media information. Levels of detail of a message are displayed based on day of receipt of the message.

20 Claims, 19 Drawing Sheets

Related U.S. Application Data continuation of application No. 14/500,924, filed on Sep. 29, 2014, now Pat. No. 9,110,565, which is a continuation of application No. 12/966,204, filed on Dec. 13, 2010, now Pat. No. 8,874,665.

(52) U.S. Cl.
CPC ........ *H04L 65/403* (2013.01); *H04L 65/4007* (2013.01); *H04L 67/22* (2013.01); *H04L 67/306* (2013.01)

(58) Field of Classification Search
CPC ... G06F 3/0485; G06F 3/0481; H04L 65/403; H04L 51/046; H04L 65/4007; H04L 67/22; H04L 67/306; H04L 51/043; H04L 51/32; G06Q 10/107; G06Q 50/01; H04W 4/12
See application file for complete search history.

(56) References Cited

U.S. PATENT DOCUMENTS

| | | | | |
|---|---|---|---|---|
| 2008/0167078 A1* | 7/2008 | Eibye | ................ | H04M 1/72522 455/566 |
| 2009/0305732 A1* | 12/2009 | Marcellino | ........... | H04L 12/587 455/466 |
| 2009/0311993 A1* | 12/2009 | Horodezky | ....... | H04M 1/72522 455/412.2 |
| 2010/0058190 A1 | 3/2010 | Hodgson | | |
| 2010/0192219 A1 | 7/2010 | Carvajal et al. | | |
| 2010/0287256 A1 | 11/2010 | Neilio | | |
| 2011/0119610 A1* | 5/2011 | Hackborn | ............. | G06F 3/0481 715/768 |
| 2012/0124475 A1* | 5/2012 | Foote | ................. | H04N 7/17318 715/719 |

OTHER PUBLICATIONS

Office Action dated Jun. 18, 2013 for U.S. Appl. No. 12/966,204, 44 pages.
Office Action dated Apr. 29, 2014 for U.S. Appl. No. 12/966,204, 50 pages.
Notice of Allowance dated Jun. 24, 2014 for U.S. Appl. No. 12/966,204, 47 pages.
"Windows Phone" <http://www.microsoft.com/windowsphone/en-us/default.aspx>, 1 page.
"Windows Phone—Discover" <http://www.microsoft.com/windowsphone/en-us/features/default.aspx>, 1 page.
"Windows Phone—Discover" <http://www.microsoft.com/windowsphone/enus/features/default.aspx#start-screen-live-tiles>, 1 page.

* cited by examiner

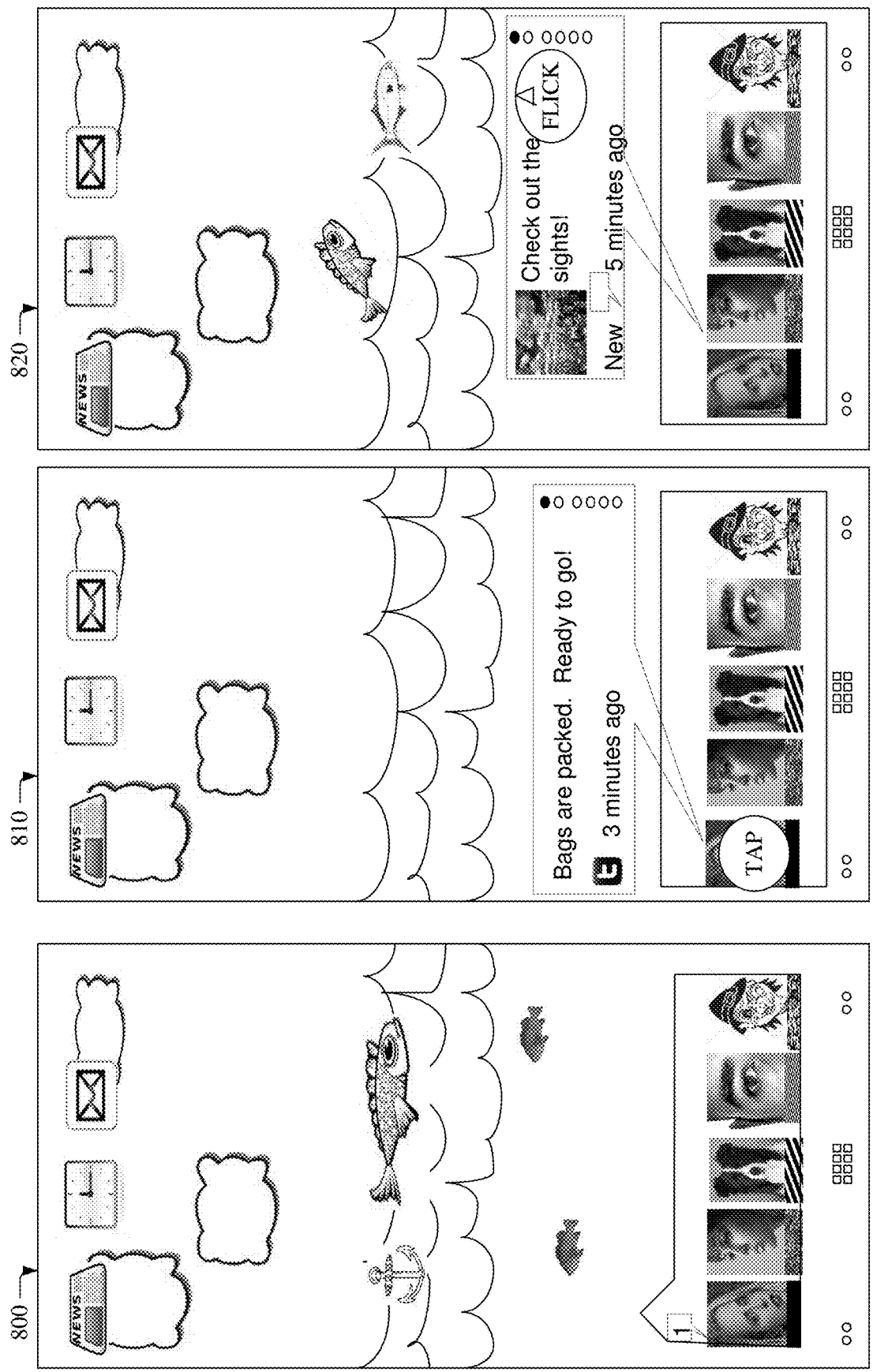

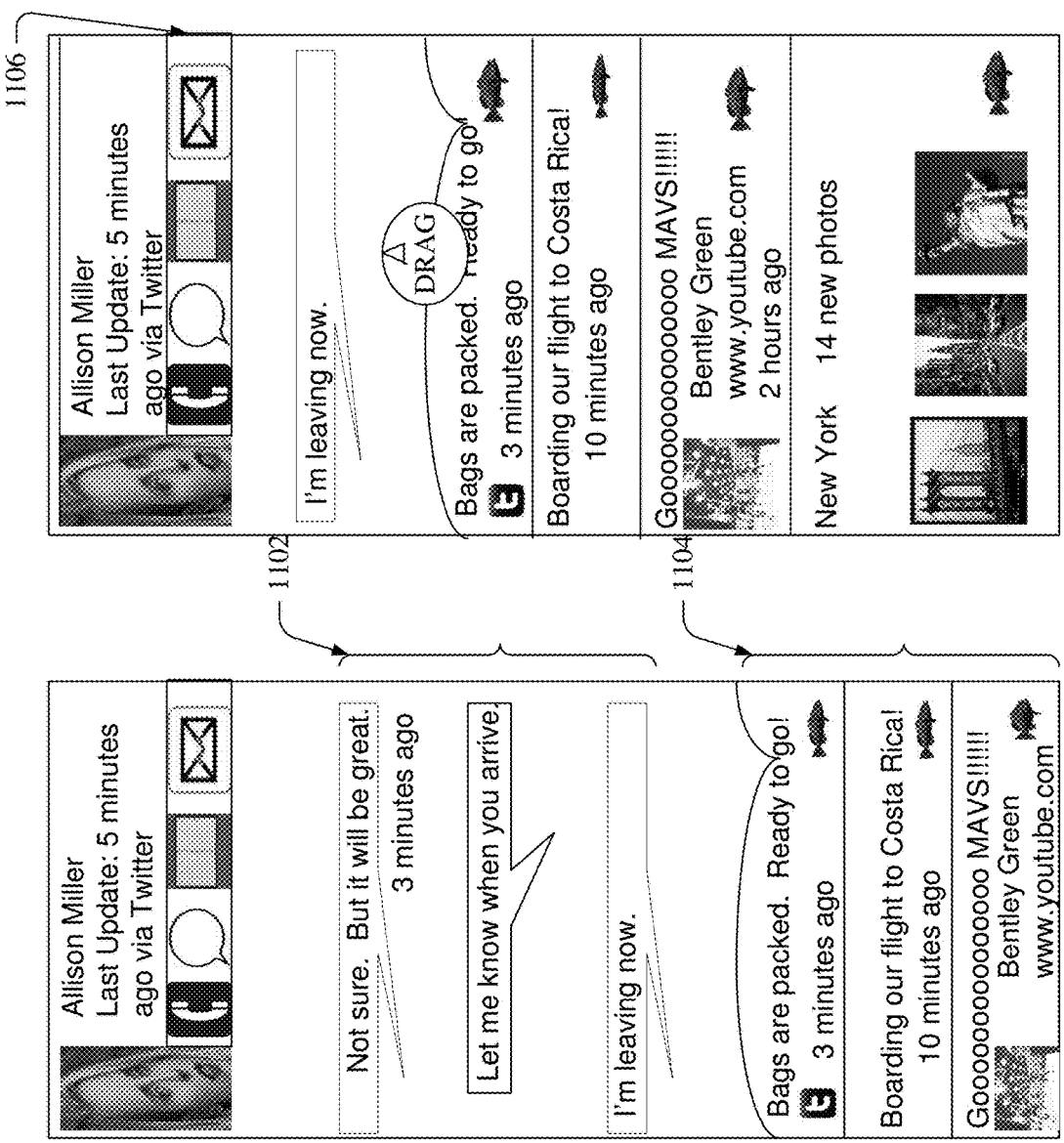
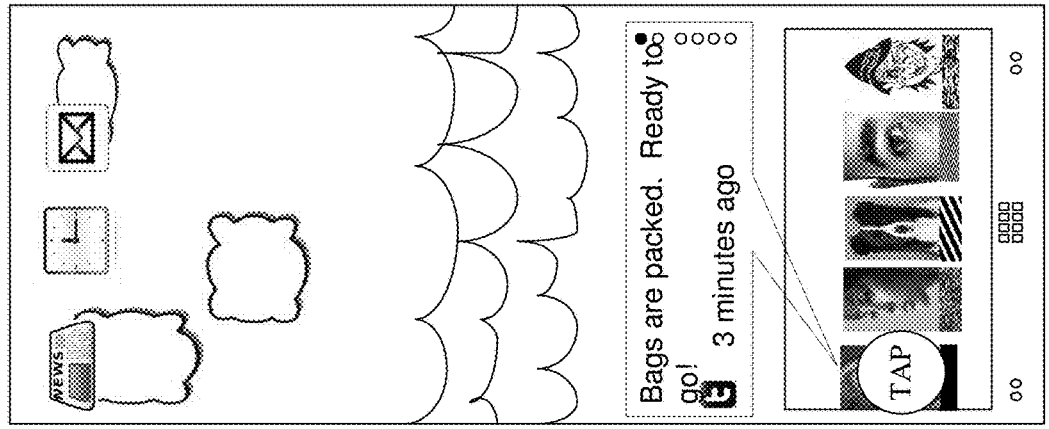
FIG. 11A   FIG. 11B   FIG. 11C

SYSTEMS, APPARATUS AND METHODS FOR FACILITATING MULTIPLE LEVELS OF DETAIL OF DISPLAY BASED ON RECEIPT OF MESSAGING AND MANAGEMENT OF INFORMATION FOR COMMUNICATION DEVICES

CROSS-REFERENCE TO RELATED APPLICATIONS

This application is a continuation of, and claims priority to each of, U.S. patent application Ser. No. 14/795,580, filed Jul. 9, 2015, and entitled "SYSTEMS, APPARATUS AND METHODS FOR FACILITATING DISPLAY AND MANAGEMENT OF INFORMATION FOR COMMUNICATION DEVICES," which is a continuation of U.S. patent application Ser. No. 14/500,924 (now U.S. Pat. No. 9,110,565), filed Sep. 29, 2014, and entitled "SYSTEMS, APPARATUS AND METHODS FOR FACILITATING DISPLAY AND MANAGEMENT OF INFORMATION FOR COMMUNICATION DEVICES," which is a continuation of Ser. No. 12/966,204 (now U.S. Pat. No. 8,874,665), filed Dec. 13, 2010, and entitled "SYSTEMS, APPARATUS AND METHODS FOR FACILITATING DISPLAY AND MANAGEMENT OF INFORMATION FOR COMMUNICATION DEVICES." The entireties of these applications are hereby incorporated by reference herein.

BACKGROUND

With advancements in technology, communication devices are becoming ubiquitous throughout society due to the convenience of use resultant from their lightweight nature and extensive information processing capabilities. Users are demanding that a plethora of different types of information be provided to the devices, and are pushing the envelope on the applications and information that are required to be provided via the devices to maintain contact with friends and colleagues. For example, the ability to form online social networks (SNs) with others has increased the possibilities for casual, business and family networking. The popularity of such SNs, and the social networking sites (SNSs) that facilitate such SNs, has caused users of such sites, and the social media (SM) information provided to and retrievable from such sites, to be immense. To fully reap the benefits of the SNs, many users also access contacts, status updates, wall postings and/or photo albums of friends via their communication devices. Ever present challenges for users of communication devices are efficiently viewing and retrieving select SM information and other up-to-date information and/or managing the relationships with other users of SNSs with which the owner of the communication device is affiliated. Further, because of the foregoing, users of communication devices are often confronted with a massive amount of information. Such a sizeable amount of information can make retrieval of desired information somewhat complex, time-consuming and inefficient.

Accordingly, systems, apparatus and methods for facilitating display and management of information for communication devices are desirable.

BRIEF DESCRIPTION OF THE DRAWINGS

Non-limiting and non-exhaustive embodiments of various aspects detailed herein are described with reference to the following figures, wherein like reference numerals refer to like parts.

FIGS. 8A, 8B and 8C illustrate block diagrams of display regions of UIs facilitating display of dynamically updatable wallpaper with widgets for a communication device in accordance with various aspects and embodiments described herein.

FIGS. 9, 10, 11A, 11B and 11C illustrate block diagrams of display regions of UIs facilitating display via the supporting applications component in accordance with various aspects and embodiments described herein.

DETAILED DESCRIPTION

Figure 1:
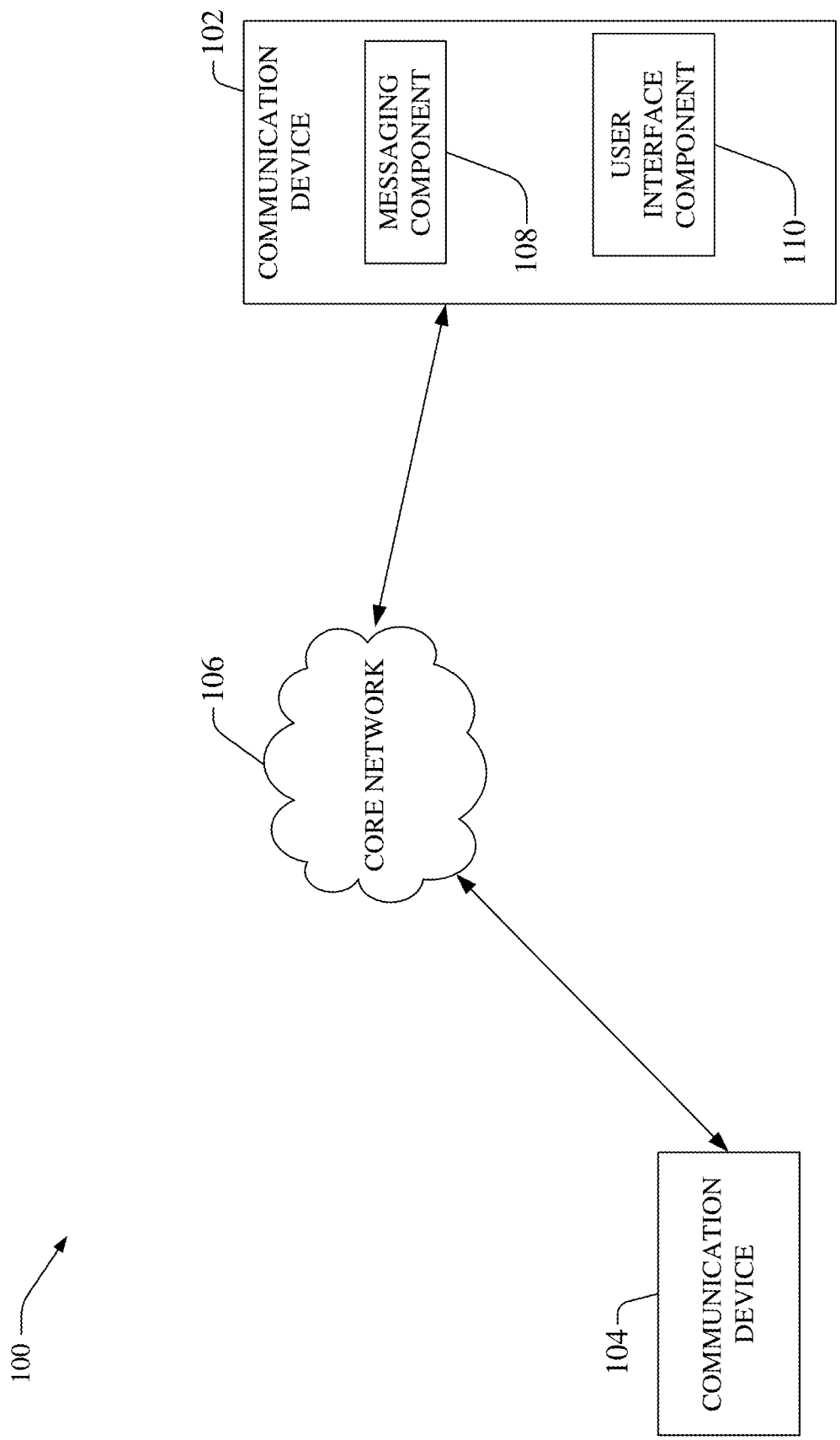
FIG. 1 illustrates a block diagram of an exemplary system for display and management of information for communication devices in accordance with various aspects and embodiments described herein.

Certain illustrative embodiments are described herein in the following description and the annexed drawings. These embodiments are merely exemplary, non-limiting and non-exhaustive. As such, all modifications, alterations, and variations within the spirit of the embodiments is envisaged and intended to be covered herein.

Further, in the following description, for purposes of mere explanation, numerous, specific details are set forth in order to facilitate a more thorough understanding of the embodiments described herein, including the claimed subject matter. However, as is known to those of ordinary skill in the art, the embodiments can be practiced, in many instances, without inclusion of the specific details.

As used in this application, the terms "component," "module," "system," "interface," and the like, are generally intended to refer to hardware and/or software or software in execution. For example, a component can be, but is not limited to being, a process running on a processor, a processor, an object, an executable, a thread of execution, a program and/or a computer. By way of illustration, both an application running on a controller and the controller can be a component. One or more components can reside within a process and/or thread of execution and a component can be localized on one computer and/or distributed between two or more computers. As another example, an interface can include input/output (I/O) components as well as associated processor, application and/or application programming interface (API) components, and can be as simple as a command line or as complex as an Integrated Development Environment (IDE).

Furthermore, the embodiments can be implemented as a method, apparatus or article of manufacture using standard programming and/or engineering techniques to produce software, firmware, hardware, or any combination thereof to control a computer, apparatus or article of manufacture to implement the functionality disclosed herein. The term "article of manufacture," as used herein, is intended to encompass a computer program, or computer program product, accessible from any computer-readable device, computer-readable carrier, computer-readable media or computer-readable storage media. As known to those of ordinary skill in the art, modifications can be made to the above embodiments without departing from the spirit of the disclosure.

It will be appreciated by one of skill in the art that a communication network for systems described herein can include any suitable mobile- and/or wireline-based circuit-switched communication network including a global systems for mobile communication (GSM) network, a time division multiple access (TDMA) network, a code division multiple access (CDMA) network, such as IS-95 and subsequent iterations of CDMA technology, an integrated digital enhanced network (iDEN) network and a public switched telephone network (PSTN). Further examples of a communication network can include any suitable data packet-switched or combination data packet/circuit-switched communication network, wired or wireless internet protocol (IP) network such as a voice over internet protocol (VoIP) network, an IP data network, a universal mobile telecommunication system (UMTS) network, a general packet radio service (GPRS) network, or other communication networks that provide streaming data communication over IP and/or integrated voice and data communication over combination data packet/circuit-switched technologies.

Similarly, one of ordinary skill in the art will appreciate that a communication device for systems disclosed herein can include a mobile device, mobile phone, a PSTN phone, a cellular communication device, a cellular phone, a satellite communication device, a satellite phone, a VoIP phone, a wireless fidelity (WiFi) phone, a dual-mode cellular/WiFi phone, a combination cellular/VoIP/WiFi/Worldwide Interoperability for Microwave Access (WiMAX) phone or any suitable combination thereof. Specific examples of a mobile device can include, but is not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones UMTS VoIP phones, or like devices or combinations thereof. To provide support for a mobile device, a gateway routing component can include any suitable component that can perform centralized routing within a mobile, satellite, or similar network (but optionally need not include components that route strictly within a PSTN network), routing between communication networks, between networks of varying architecture (e.g., between PSTN, GSM, Universal Mobile Telecommunications System (UMTS), Enterprise VoIP, the Internet, or combinations thereof), and the like. Specific examples of a gateway routing component can include, but are not limited to, a gateway mobile switching center (GMSC), a gateway general packet radio service (GPRS) support node (GGSN), a session border control (SBC) device, or like devices. Additionally, a data storage component of such a system can include any suitable device, process and/or combination device and process that can store digital and/or switched information (e.g., server, database, data store, or the like).

The aspects described herein include systems, apparatus, methods and computer-readable storage media for display and management of information for communication devices. Display and management of information can be facilitated via display of dynamically updatable wallpaper and/or widgets on the communication device. In some embodiments, the communication device can also display SM information and/or text messages for a particular contact thus providing the user with filtered glances of messaging and/or social network activity for up to a number of favorite contacts. The embodiments can also advantageously provide integrated display of heterogeneous (e.g., IM, MMS, SMS, IP messaging, etc.) messaging for a single contact. Bubble notches for messages and/or picture curls for contacts pictures (or for avatars) can be employed to identify the contact to which the message or social network activity is related.

By way of example, but not limitation, systems, apparatus, methods and computer-readable storage media described herein can enable the selection of a number of favorite contacts (and display of avatars or pictures to represent the contacts), and provide display and management of information directly on the display of the communication device for the favorite contacts. One-click access to messaging and SM information for the contacts is also provided by displaying such information upon detection of a single click or tap on the portion of the user interface (UI) corresponding to the contact of interest.

By way of another example, but not limitation, systems, apparatus and methods described herein can provide users and/or third-party developers a unique framework to define visual representation of messaging and SM information via the dynamically updatable wallpaper, widgets, supporting applications and/or a combination of any of the three.

By way of another example, but not limitation, systems, apparatus, methods and computer-readable storage media described herein can provide display and management of information by providing a supporting applications component configured to provide a split screen layout displaying SM information and text messages for a favorite contact at different parts of the dynamically updatable wallpaper. In other embodiments, however, the split screen is not provided as part of the wallpaper. Rather, the split screen is a screen independent of the wallpaper, and that can be displayed to the user via the UI upon the user selecting a contact of interest.

In one aspect, a computer-implemented method is provided. The method includes: displaying, via a user interface of a communication device, a dynamically updatable wallpaper comprising a personalized theme personalized to a user of the communication device. The method also includes updating the dynamically updatable wallpaper to display one or more animated icons. Displaying the animated icons is based, at least, on detected activity of respective contacts associated with the one or more animated icons.

In another aspect, an apparatus is provided. The apparatus includes: a processor; a UI component configured to display images indicative of contacts, wherein the plurality of contacts are predefined by a user of the apparatus. The apparatus also includes a messaging component configured to: integrate different types of text messages for one of the contacts; and provide concurrent display of the text messages and social media information for one of the contacts; and a computer-readable storage medium storing computer-executable instructions that, if executed, cause the apparatus to perform one or more functions of the UI component or the messaging component.

In another aspect, a computer-readable storage medium is provided. The computer-readable storage medium has instructions stored thereon that, when executed by a processor, cause a method to be performed. The method includes: displaying, via a user interface of a communication device, a dynamically updatable wallpaper comprising a personalized theme personalized to a user of the communication device; and updating the dynamically updatable wallpaper to display one or more animated icons, wherein the displaying the one or more animated icons is based, at least, on detected activity of a respective one or more contacts associated with the one or more animated icons.

FIG. 1 illustrates a block diagram of an exemplary system for display and management of information for communication devices in accordance with various aspects and embodiments described herein. In some embodiments, the display and management of information can be facilitated by dynamically updating wallpaper displayed on the communication devices, and/or providing widgets that display SM information and/or text messages associated with a contact. In some embodiments, the wallpaper can include the widgets (or widgets can exist independent of the wallpaper) and the widgets can be activated to provide detailed information regarding any number of different types of information including, but not limited to, news information, weather information, time information, SM information, contacts information, entertainment information, emails, text messages, images or pictures or avatars of selected contacts or the like. In various embodiments, the SM information can include any number of different types of information to, from or about users (or SN friends or organizations) with which the user/owner of the communication device is affiliated. By way of example, but not limitation, SM information can include wall postings, status updates or messages from (or to) users or SN friends or organizations.

In various embodiments, the wallpaper and/or widgets can display at-a-glance views of messages and social updates from selected contacts associated with and/or stored on the communication device 102, 104. In some embodiments, the selected contacts can be those indicated as having an important or otherwise high-level status by the user/owner of the communication device 102, 104 on which the contacts are stored or from which the contacts are accessed. In some embodiments, the user of the communication device 102, 104 can populate clouds to which the communication device 102, 104 is communicatively coupled with selected information regarding favorite or selected contacts and/or SN preferences. As used herein, the term "contacts" can include information indicative of a real or legal entity, including, but not limited to, a human, organization, group of entities or the like.

In an aspect, the system 100 can include communication devices 102, 104 and a core network 106. The communication devices 102, 104 can be communicatively coupled to the core network 106. In various embodiments, one or more of communication devices 102, 104 can include the software, hardware and/or have the functionality and/or structure (or portions thereof) of communication device 202 described below (and vice versa).

In various embodiments, the core network 106 can include one or more of software, hardware and/or combination software and hardware configured to provide connectivity to and between the communication devices 102, 104. The system 100 can include one or more macro, Femto and/or pico access points (APs) (not shown), base stations (BS) (not shown) or landline networks (e.g., optical landline networks, electrical landline networks) (not shown) communicatively coupled between one or more of the communication devices 102, 104 and the core network 106 to provide connectivity between the communication devices 102, 104 and the core network 106. In various embodiments, the communication devices 102, 104 can communicate via any number of various types of wireless technologies including, but not limited to, cellular, WiFi, WiMax, wireless local area networks (WLAN), etc. In corresponding embodiments, the core network 106 can provide cellular, WiFi, WiMAX, WLAN and other technologies for facilitating such communication. The core network 106 can also include the Internet (or another communication network (e.g., IP-based network), a digital subscriber line (DSL)-type or broadband network facilitated by Ethernet or other technology. The core network 106 can also include, in various embodiments, servers including, email, multimedia, audio, weather, time, video, news, financial or stock information servers. By way of example, but not limitation, the core network 106 can include cloud storage for storing information including, but not limited to, selected contacts for display on the communication devices 102, 104.

The core network 106 can also include short message service (SMS) networks and multimedia message service (MMS) networks. The core network 106 can also include, but is not limited to, routers, nodes, switches, interfaces, and/or controllers that can facilitate communication of data to or from the communication devices 102, 104. The core network 106 can transmit and receive voice, text, pictorial, video, audio and/or data traffic to and from the communication devices 102, 104. While only communication devices 102 and 104 are shown, in various embodiments, the core network 106 can include or can be communicatively coupled to other communication devices inside or outside of the network. In various embodiments, the network can also include hardware, software and/or a combination of hardware and software for allocating resources to the communication devices 102, 104, converting or enforcing protocols, establishing and/or providing levels of Quality of Service (QoS), applications or services in the network, translating signals, and/or performing other desired functions to facilitate system interoperability and communication to or from the communication devices 102, 104.

In various embodiments, the core network 106 can include or can be communicatively coupled to one or more of SNS servers (not shown), Internet (not shown), multimedia servers (not shown) or email servers (not shown) for communicating one or more of text or email messages, data, pictures, multimedia, voice or video.

The core network 106 can also include databases and/or memory storing information and/or computer-readable storage media storing computer-executable instructions enabling various operations by the communication devices 102, 104. In some embodiments, the core network 106 can include databases and/or memory storing computer-executable instructions and/or settings for providing display and management of information to, from or within the communication devices 102, 104. In some embodiments, a database can store settings, and/or memory can store computer-executable instructions, enabling the communication device 104 to provide the messaging as described in greater detail herein. For example, the database can store information indicative of time intervals during which information (e.g., time, news, and weather) displayed via dynamically updatable wallpaper and/or widgets are updated. The database can also include information indicative of whether a contact is a favorite and/or selected contact.

In various embodiments, the communication devices 102, 104 can be mobile, wireless, wireline and/or optical devices. The communication devices 102, 104 can include, but are not limited to, a mobile or cellular telephone including, but not limited to, a smartphone, BLUETOOTH® device, a 3GPP UMTS phone, a personal digital assistant (PDA), computer, IP television (IPTV), wireline phone with mobile messaging functionality, gaming console, a set top box (STB), a multi-media recorder, a multi-media player, a video recorder, a video player, an audio recorder, an audio player, laptop, a printer, a copier and/or a scanner.

In various embodiments, the communication devices 102, 104 can include hardware, software or a combination of hardware and software facilitating operation according to one or more communication protocols described above with reference to the core network 106, or the functionality facilitated by the hardware, software or combination hardware and software described above with reference to the core network 106. The communication protocols and/or functionality can include, but are not limited to, MMS, SMS, WLAN, WiFi, WiMAX, GPRS, IP, IP messaging, BLUETOOTH® protocols, text messaging, electronic mail messaging, facsimile, multimedia and/or any number of other protocols or functionalities as described above with reference to the communications protocols or functionalities facilitated by core network 106. In various embodiments, the communication devices 102, 104 can transmit and/or receive voice, text, pictorial, video, audio and/or data traffic to and from the communication devices 102, 104. In some embodiments, the communication devices 102, 104 can include the ANDROID® operating system. In some embodiments, the communication devices 102, 104 can be configured to include software developed using the ANDROID® version 2.1 or later software development kit.

In some embodiments, the communication devices 102, 104 can include hardware, software and/or a combination of hardware and software to facilitate providing display and management of information to, from or within the communication devices 102, 104 as described herein. For example, in various embodiments, as shown at communication device 102, the communication devices 102, 104 can include a messaging component 108 and a UI component 110.

In various embodiments, the messaging component 108 can be configured to process SM information and/or text messages received from and/or transmitted to a contact. In various embodiments, the UI component 110 can be configured to receive, output or display information (e.g., dynamically updatable wallpaper, dynamically updatable wallpaper and widget combined, or widget(s) alone), messaging functions or protocols, provide or enable communication to or from the communication device 102, access information stored within, or store information within, the communication device 102 or receive information output from the communication device 102.

In one embodiment, the UI component 110 is configured to display a plurality of images indicative of a plurality of contacts, wherein the plurality of contacts are determined by the user of the communication device 102.

The messaging component 108 is configured to provide concurrent access to text messages and SM information for one of the plurality of contacts. In some embodiments, providing concurrent access to text messages and SM information for the contact is based on the UI component 110 receiving a single input selecting the contact.

The communication device 102 can also include a processor and a computer-readable storage medium storing computer-executable instructions that, if executed, cause the apparatus to perform one or more functions of the UI component 110 or the messaging component 108.

In some embodiments, the UI component 110 is further configured to receive an input indicative of a selection of one of the plurality of the contacts. The plurality of images can be a plurality of pictures in some cases, and a selected picture can be displayed with a picture curl to provide an efficient visual indicator to the user of the communication device 102 as to which contact has been selected.

In some embodiments, the UI component 110 is further configured to receive an input indicative of a selection of one of the contacts; and concurrently display one or more text messages and SM information associated with the selected contact. In some embodiments, the text messages and the SM information are displayed concurrently but in different portions of the UI.

In various embodiments, the UI component 110 can display dynamically updatable wallpaper that includes animated icons (e.g., fish, buoys, etc.) representative of contacts. The animated icons can be assigned to the contacts by the user of the communication device 102.

While the embodiments described include animated icons being assigned by the user of the communication device, in some embodiments, the contact or any third-party can send the user of the communication device a selected icon or avatar to represent the contact. As such, the contact or a third-party can select the icon representative of the contact.

Additionally, as used herein, the terms icons and animated icons each mean images, animations, figures, pictures, avatars capable of becoming animated (or having animation displayed therefore through action of the icons).

Turning back to FIG. 1, the animated icons can be displayed by the UI component 110 upon the messaging component 108 detecting social network activity of the contact corresponding to the icon and/or receipt of a text message from (or, in some cases, transmission of a text message to) the contact. While exemplary animated icons are fish and buoys, the animated icons can be any number of objects or images able to be visually displayed in a wallpaper.

By way of example, but not limitation, different wallpaper with different personalized themes can be displayed via the communication device 102. Accordingly, embodiments herein provide a personalized scheme personalized to the mobile user. Other examples of wallpapers (besides the fish scheme) providing the personalized schemes described herein include, but are not limited to, super hero themes, mailman versus dog themes, owl (or other bird) messenger themes, a jellyfish and ocean theme and poster themes.

Figure 4C:
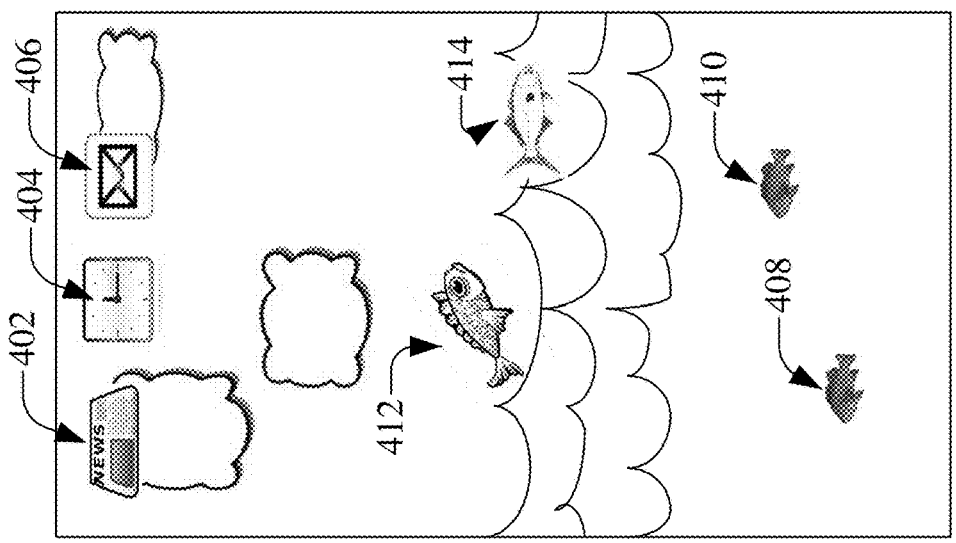
Figure 4B:
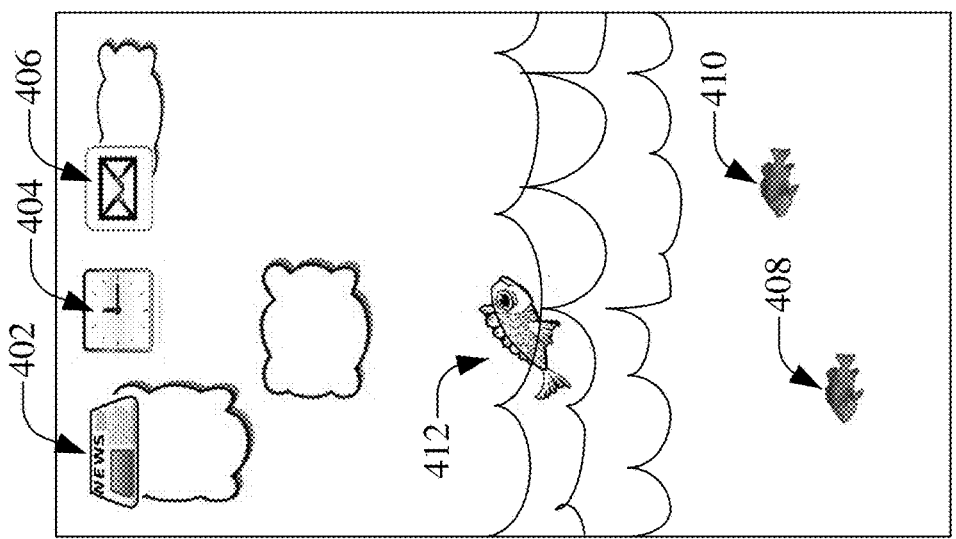
Figure 4A:
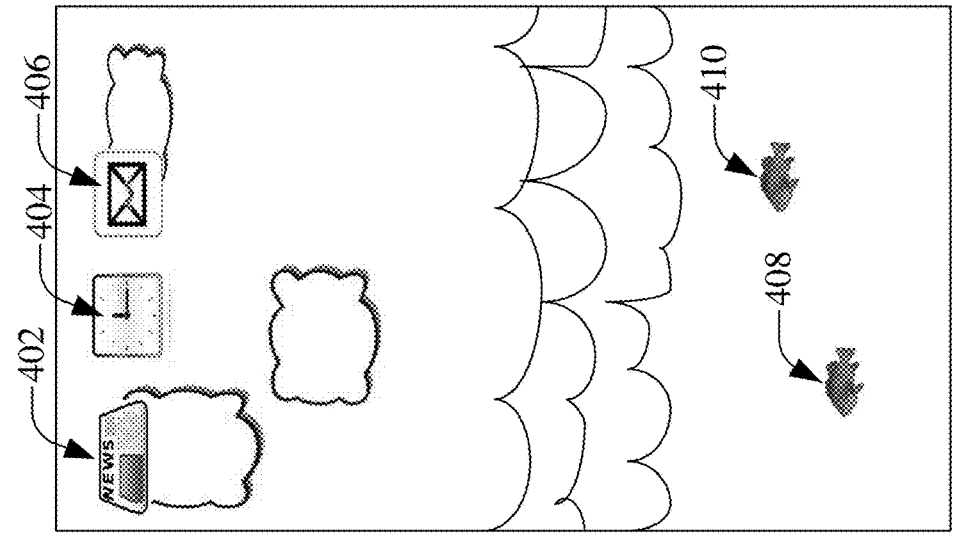
Figure 4F:
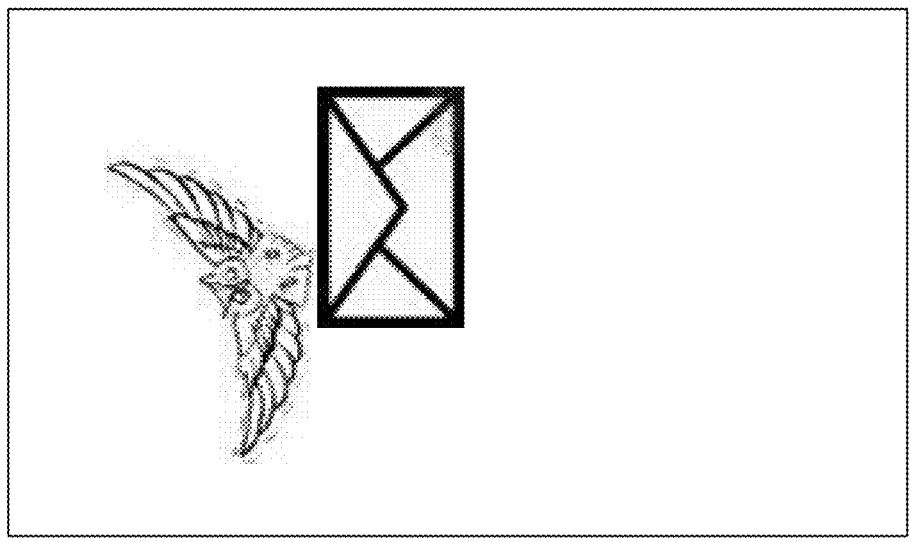

The activity displayed to indicate the social networking activity and/or messaging can be based on the theme. For example, in a poster theme, new activity can be displayed as a new horizontal row of text above the previous rows of text, forming an image of a poster with horizontal rows of wording in which the rows represents different activity. The wallpaper can depict activity by scrolling down previously-displayed messaging information, and displaying new messaging, such as that shown on FIG. 4D.

Figure 4E:
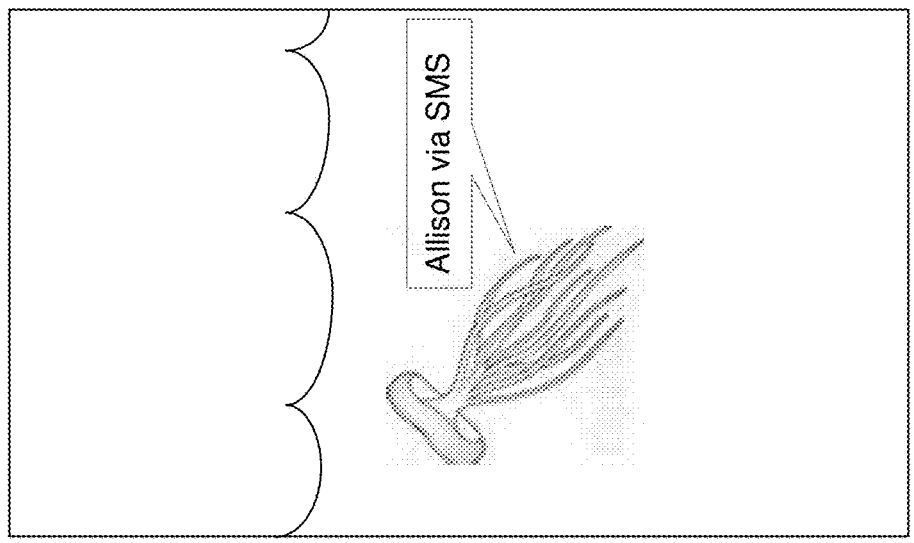
Figure 4D:
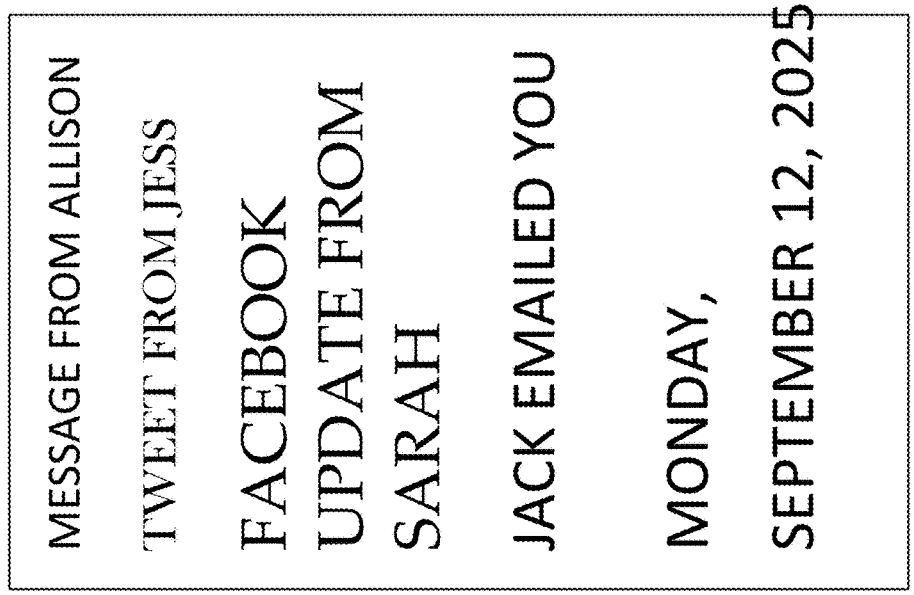

As another example, a jellyfish and ocean theme in which the wallpaper activity displays the jellyfish swimming in the ocean and providing information about messaging is shown in FIG. 4E.

As another example, the owl messenger theme in which the wallpaper activity displays the owl (or other bird) flying and carrying an envelope (or other indicia of messaging content) is shown in FIG. 4F.

In various embodiments, the systems, methods and apparatus herein can also display messaging information for the wallpapers, and can do so at varying levels of privacy. The messaging information can be messaging information via text messages or via posts and other messages from SNSs.

By way of example, but not limitation, private, conservative and open levels of messaging can be displayed via the wallpaper. Since the messages are displayed via the wallpaper, some users may want to limit the information about the messages that can seen by others who are near the communication device and therefore able to see the wallpaper and messaging information. The level of messaging can be set (and re-set) by the user of the communication device according to the user's preferences. In some embodiments, the preference can be automatically changed according to a time of day, day of the week or any other criteria designated by the user.

With a private level of privacy, a visual indication that a message has been received can be displayed but details of the contact that sent the message and details of the content of the message would not be displayed. For example, in the above-referenced owl messenger scheme, an owl can be displayed merely holding an envelope. As another example, in the poster theme, text can display wording merely informing the user that a message has been received (e.g., "You received a text message").

With a conservative level of privacy, a visual indication of the identity of a sender of a message can be displayed. In some embodiments, the source of the message (text message versus FACEBOOK® message) but details of the content of the message would not be displayed. For example, in the above-referenced owl messenger scheme, the owl can be displayed holding an envelope that displays the name of the sender of the message. As another example, in the poster theme, text can display wording merely informing the user that a message has been received from a particular contact (that is named as part of the display, e.g., "Rob sent you a text message").

With an open level of privacy, a visual indication of the identity of a sender of a message can be displayed along with the source of the message and the content of the message. For example, in the above-referenced owl messenger scheme, the owl can be displayed holding an opened enveloped that shows a piece of paper that includes the name of the sender, the source of the message and the content of the message. As another example, in the poster theme, text can display wording merely informing the user that of the name of the particular contact, source of the contact and the message content (e.g., "Email from Rob. Subject: Party Tonight. Email Message: Are you still going to the party tonight? Whose driving?").

In some embodiments, with the open level of privacy, the content of the message is abbreviated and the user must select or activate the UI (or scroll through the truncated message) to display the entire message.

Widgets can also be displayed in addition to or in lieu of the wallpaper. A widget can include avatars or pictures displaying the one or more contacts when the widget is in a collapsed state, and a history of SM information and/or text messages for the contact (along with the avatars and pictures) when the widget is in an expanded state. In various embodiments, the SM information and the text messages can be displayed by the UI component 110 in different portions of the UI.

While display and management of information are described with reference to communication device 102, in various embodiments, the communication device 102 can be or include one or more of the functions or structure (or portions thereof) of communication device 104 or 202 (and vice versa).

Figure 2:
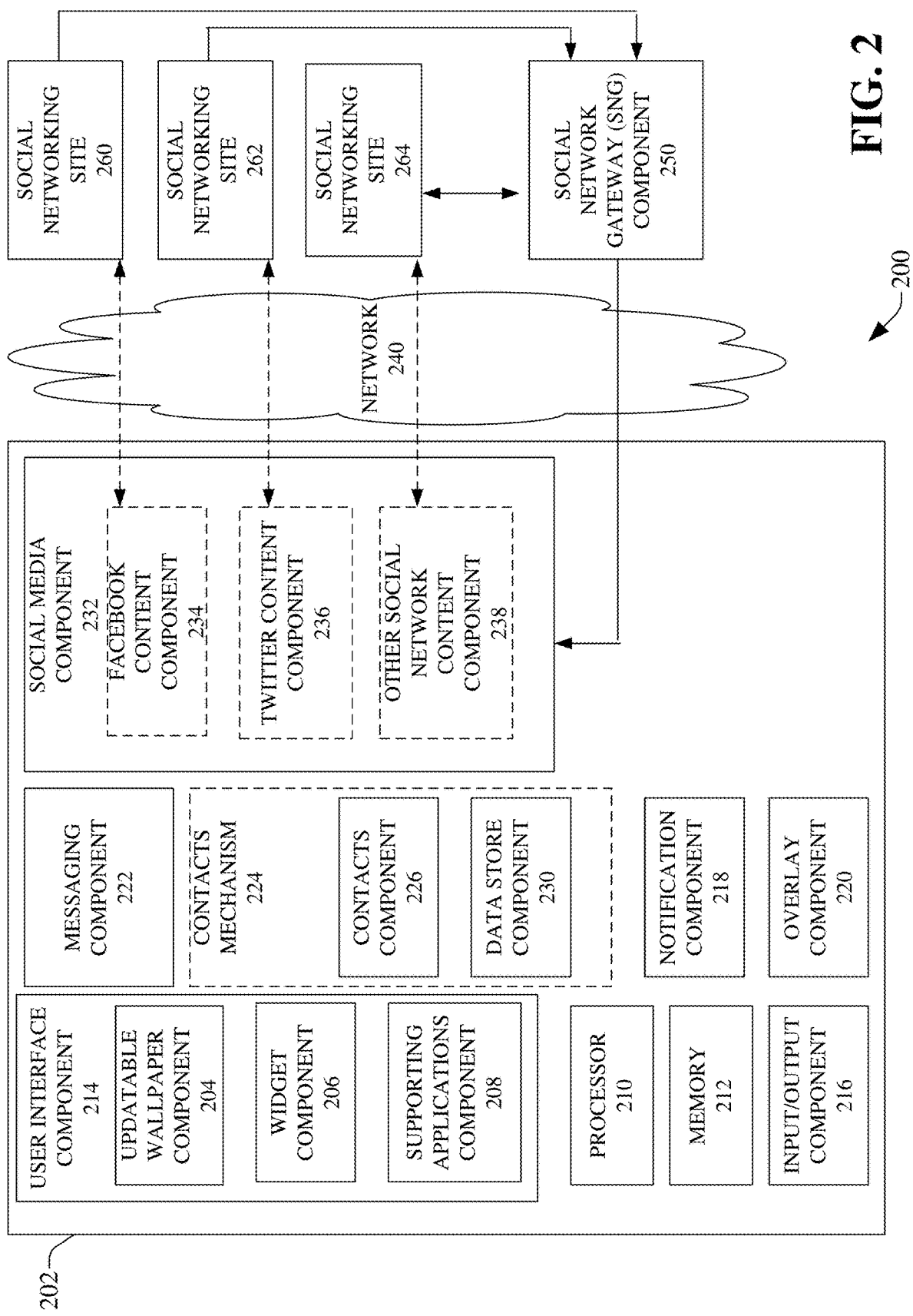
FIG. 2 illustrates a block diagram of another exemplary system for display and management of information for communication devices in accordance with various aspects and embodiments described herein.
Figure 3:
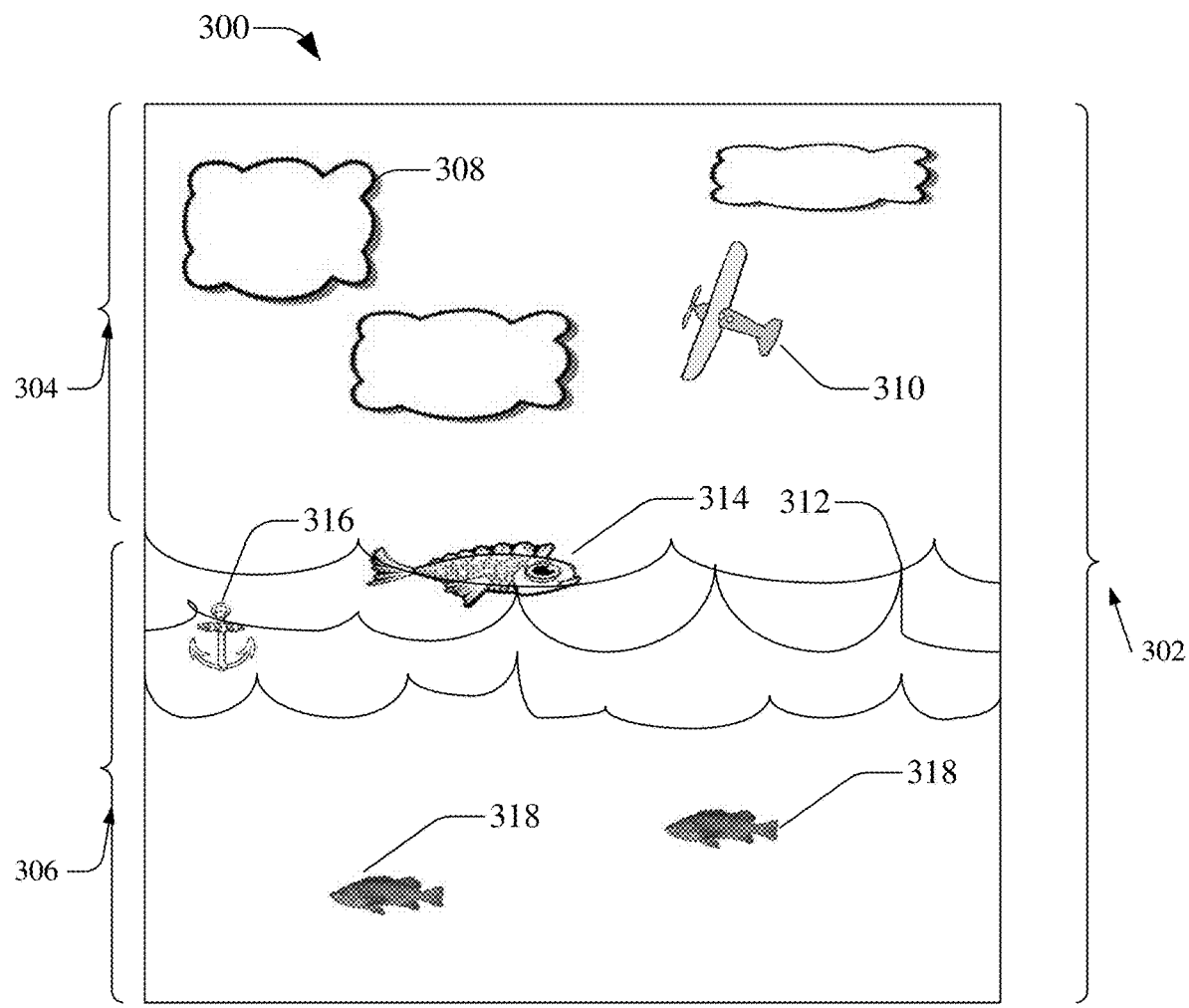
FIGS. 3, 4A, 4B, 4C, 4D, 4E and 4F illustrate block diagrams of display regions of UIs facilitating display of dynamically updatable wallpaper for a communication device in accordance with various aspects and embodiments described herein.

FIG. 2 illustrates a block diagram of an exemplary communication system facilitating display and management of information for communication device 202. The system 200 can include a communication device 202. In some embodiments, the system 200 can also include a network 240, a social network gateway (SNG) component 250 and/or one or more SNSs 260, 262, 264. The communication device 202 can be communicatively coupled, via the network 240, to the SNG and/or one or more of the SNSs 260, 262, 264.

The communication device 202 can include a UI component 214, a messaging component 222, a contacts mechanism 224, a SM component 232, a processor 210, memory 212, I/O component 216, notification component 218 and overlay component 220. One or more of the UI component 214, messaging component 222, contacts mechanism 224, SM component 232, processor 210, memory 212, I/O component 216, notification component 218 and/or overlay component 220 can be communicatively coupled to one another to perform the functions described by communication device 202 provided herein.

The I/O component 216 can include hardware, software and/or a combination of hardware and software facilitating receipt and output of information to and from the communication device 202. The information received can be SM information, text messages, emails, news, weather, sports, time, global positioning system (GPS) information and/or inputs provided by a user of the communication device 202.

Turning next to the UI component 214, the UI component 214 can control the UI for the communication device 202. The UI can be any number of different types of UIs including, but not limited to, a graphical user interface (GUI), a touch-sensitive interface (e.g., a touch screen), an interface having capability for receiving audio or video input (and outputting audio or video information) and the like. In some embodiments described herein, the UI can include a touch screen configured to receive inputs at the touch screen and graphically output information for information display and/or management from the touch screen.

The UI can be enabled to display alpha and/or numeric characters, pictorial and image content as well as widget and other animated icons, buttons, text boxes and other visual content in various embodiments for displaying and managing information via the communication device 202. By way of example, but not limitation, the GUI can display dynamically dynamically updatable wallpaper, widgets, widgets in wallpaper and/or supporting applications such as that shown and described in greater detail below with reference to FIGS. 3, 4A, 4B, 4C, 5, 6, 7A, 7B, 7C, 8A, 8B, 8C, 9, 10, 11A, 11B and 11C.

In some embodiments, dynamically updatable wallpaper displays animated icons, images and activity of the animated icons and images to represent activity or messages to or from one or more SN friends or contacts with which the user of the communication device 202 is affiliated. For example, the wallpaper can be updated to display different animated icons, images and/or pictures as social activity being monitored by the communication device 202 changes.

Widgets can be provided to facilitate display of images or avatars of contacts and/or various information associated with the contacts. In various embodiments, a contact can be selected and one or more different applications can be launched by selecting the contact. In some embodiments, the application is launched immediately upon a single click or tap on the portion of the UI corresponding to the contact. For example, in one embodiment, the application can be a SN application controlled by the SM component 232. The SM component 232 can aggregate SM information and/or voice calls or messages associated with the selected contact.

The UI component 214 can include an dynamically updatable wallpaper component 204, a widget component 206 and a supporting applications component 208. The dynamically updatable wallpaper component 204 is configured to generate and update the wallpaper displayed on the communication device 202. The wallpaper can utilize bitmap assets to develop different styles of the wallpaper since simple layering and movement of images is described herein. More complex object deformations can be performed using two dimensional drawing primitives (e.g., ANDROID® SKIA 2D drawing library) or the use of Open Graphics Library for Embedded Systems (OpenGLES).

The wallpaper can be displayed based on the social network activity and/or text messages received from and/or transmitted to a contact. The contact can be designated by an icon and the icon can appear on the wallpaper when the social network activity is detected and/or text messages are received from or transmitted to the contact associated with the icon. The contact can be assigned to the icon by the user of the communication device 202.

Examples of dynamically updatable wallpaper are shown in FIGS. 3, 4A, 4B and 4C. The wallpaper 300 is dynamically updatable. Turning to such figures, the dynamically updatable wallpaper can include a viewable area 302, foreground elements 306 and, in some cases, background elements 304. The viewable area 302 is not actionable in some embodiments. The foreground elements 306 can include animated icons that represent contacts and/or other animated icons that represent information that the end user can easily view and understand. The foreground elements 306 shown in FIG. 3 include the water 312, fish 314 (which can appear on the wallpaper when there has been social network activity by a favorite contact), buoy 316 (which can appear when a message associated with a favorite contact has been detected) and non-active fish 318 (which can represent contacts for which no social network activity and/or new messages have been detected for a period of time and/or for which all messages have been read). The background elements 304 can provide a context for the locations and/or activity of the animated icons. For example, the background elements 304 can include the clouds 308 or plane 310 shown on the wallpaper.

Turning to FIGS. 4A, 4B, 4C, dynamically updatable wallpaper is shown for three states of activity by contacts identified by the user. For example, in FIG. 4A, there is no contact activity and hence only non-active fish 408, 410 are shown. As shown, in some embodiments, non-active fish are shown underwater. Accordingly, a user can easily determine that there has been no activity by favorite contacts by simply viewing the wallpaper on the communication device 202 and noting that only non-active fish are shown.

In FIG. 4B, the communication device 202 has detected social network activity for the contact associated with the fish 412. As such, the wallpaper is updated by the dynamically updatable wallpaper component 204 to display the fish 412. The fish is shown jumping from the water repeatedly in some embodiments until the user reviews the social network activity.

In FIG. 4C, the communication device 202 has detected social network activity for another contact (e.g., the contact associated with the fish 414). As such, the wallpaper is updated by the dynamically updatable wallpaper component 204 to display the fish 412 and fish 414. The user of the communication device 202 can therefore visually detect that social network activity has transpired for two of the user's favorite contacts by merely watching the display of the communication device 202.

Further, in some embodiments, the icon and/or activity of the icon can be assigned or generated based on a priority that can be assigned to the contact. For example, users with higher priority (within the set of favorite contacts) can be represented by bigger animated icons (or animated icons considered to have more power or be more dominant) than animated icons that represent contacts having lower priority. The priority can be assigned by the user of the communication device. By way of another example, but not limitation, the activity of an icon can vary by the priority of the contact represented by the icon. For example, the speed of the activity can be faster for social network activity or detected messages associated with a higher priority icon. In some embodiments, for example, the speed or frequency at which the fish jumps out of the water can be faster for a higher-priority contact than for a lower-priority contact.

As shown in FIGS. 4A, 4B and 4C, the dynamically updatable wallpaper can also include animated icons 402, 404, 406 that can be activated to display information and/or launch an application. For example, icon 402 can be activated to display news or weather information, icon 404 can be activated to display the time, and icon 406 can be activated to display email or launch an email application.

Turning back to FIG. 2, the UI component 214 also includes a widget component 206. The widget component 206 can display a widget on the UI of the communication device 202. In various embodiments, the widget in a collapsed state can be a display of one or more contacts such as that shown in FIG. 5. In various embodiments, the widget in an expanded state can be a display of one or more contacts and SM information and/or text messages to or from a contact such as that shown in FIG. 6.

Figure 5:
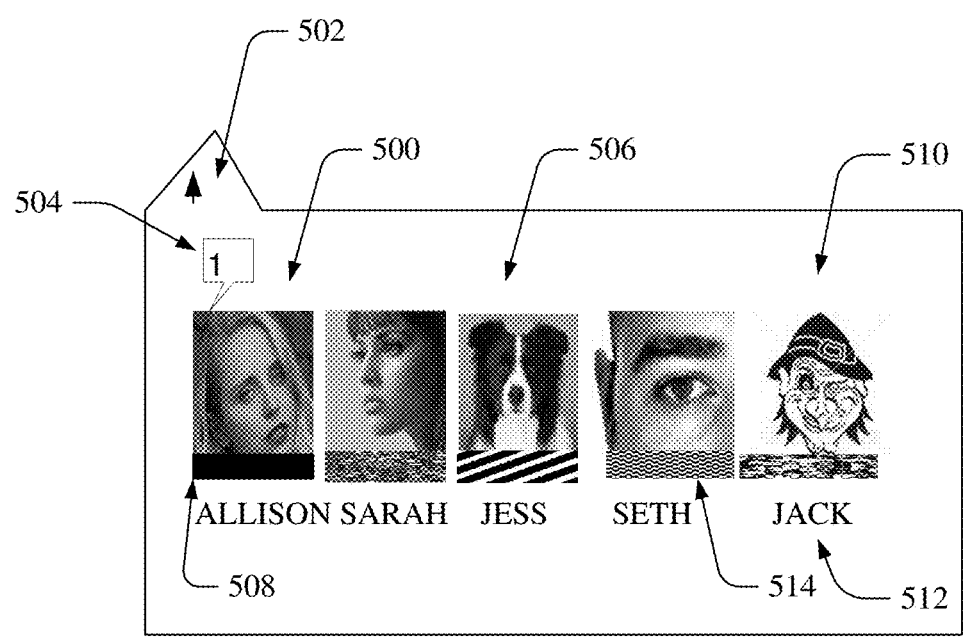
FIGS. 5, 6, 7A, 7B and 7C illustrate block diagrams of display regions of UIs facilitating display of widgets for a communication device in accordance with various aspects and embodiments described herein.

As shown in FIG. 5, the widget can be displayed as pictures of the one or more contacts and, as shown at contact Allison 500, a badge or indicia 504 of a number of messages received from or transmitted to Allison. To activate the widget, thereby causing the widget to be displayed in the expanded state, a user can tap on the portion of the UI corresponding to the contact 500, bubble 504 portion or the contact strip 502 portion of the widget.

As shown in FIG. 5, at 502, an up arrow is displayed and can be clicked to make the widget active. As shown at 504, a badge or other indicia of a number of unread messages and/or SM information is associated with the contact is provided.

As shown at 506, a picture representing a contact is displayed and at 510, an avatar representing a contact is displayed. The strip can also include the names of contacts, as shown and/or a unique color 508 and/or pattern 514 assignment for the contact. The color and/or pattern assignment can be assigned by the user of the communication device 202. In some embodiments, a maximum number of users can be displayed in the widget. The widget can be configured to resize and/or center according to the number of contacts displayed.

Figure 6:
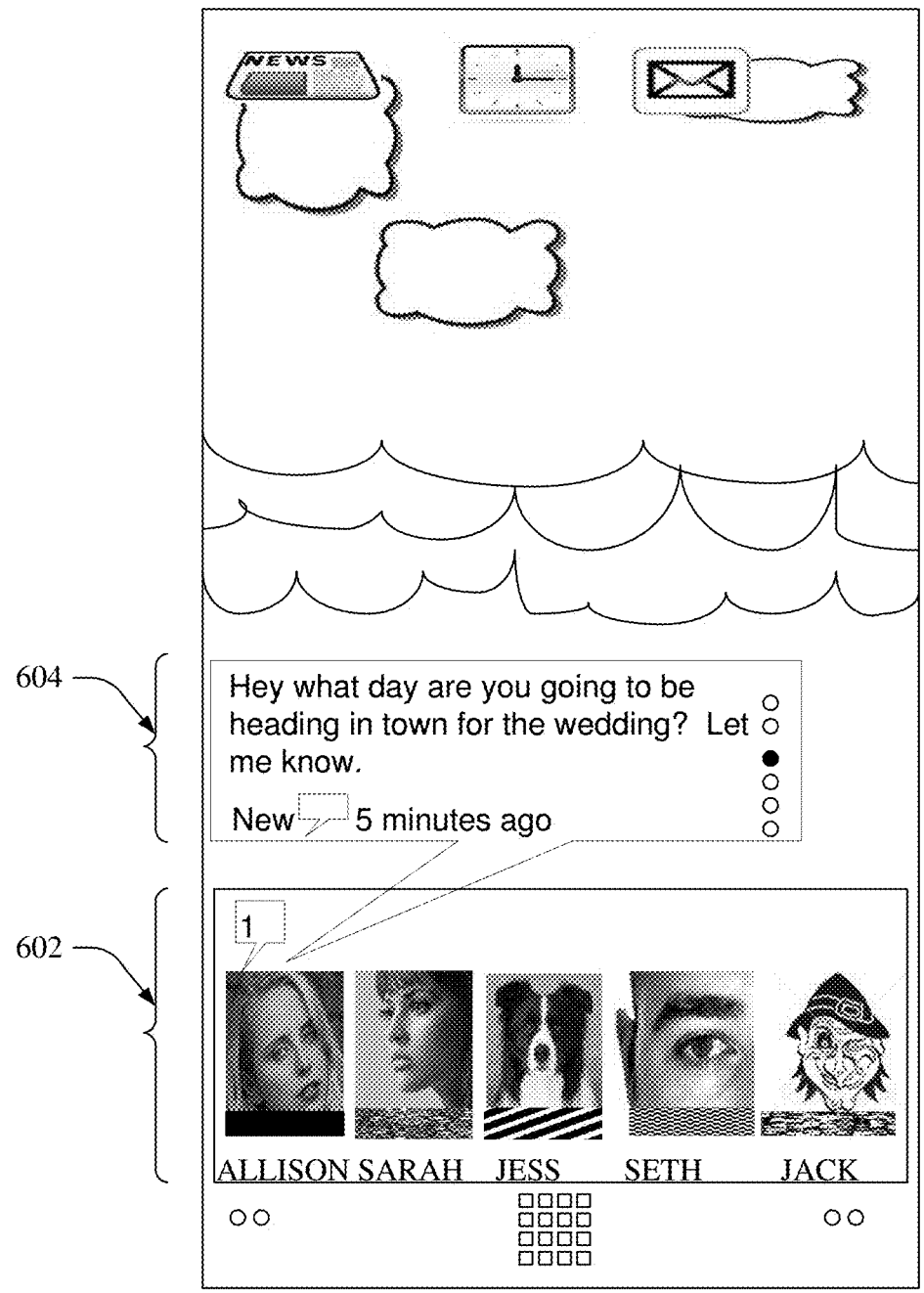

FIG. 6 is described in more detail as follows. At 602, a contact strip portion of the widget is shown. The contact strip portion shows pictures representing five contacts pre-selected by the user. The widget can be displayed in a collapsed state in which SM information associated with a contact and/or text messages associated with a contact are not displayed. Rather, in this embodiment, the widget merely displays one or more contacts and indicia of a number of messages or amount of social network activity associated with each of the one or more contacts (as shown in FIG. 5).

Centering can be relative to the message bubble 604 portion of the widget, also shown in FIG. 6. The message bubble can include up to a predetermined number of recent messages. The user of the communication device can scroll through the messages vertically and/or tap on a single message to take action relative to the message. Exemplary actions can include replying to the message, expanding the message on the wallpaper or the like. The message bubble can include a pointer pointing to the contact within the contact strip 602 portion of the widget for which the message is associated. While not shown in FIG. 6, bubbles can also include SM information (as shown and discussed below with reference to FIG. 9).

In various embodiments, the contact strip 602 portion of the widget can be vertical, diagonal, circular or any number of other shapes. In another example, the widget is merely an arrangement of one or more contacts, and need not be formed into a contiguous strip of any shape. For example, the widget could be displayed as a random arrangement of pictures or avatars on the wallpaper.

Figure 7A:
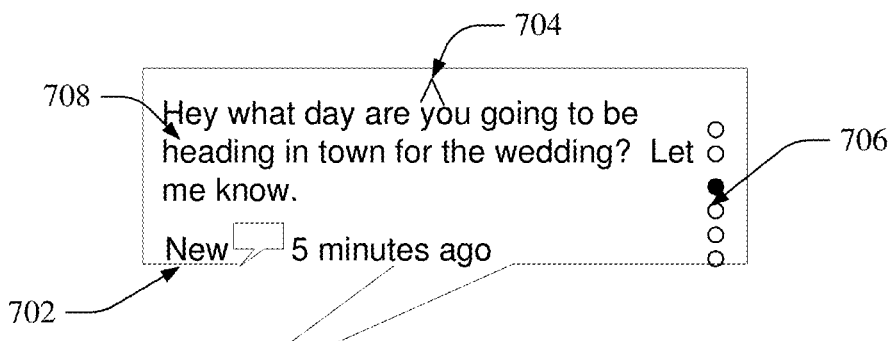
Figure 7B:
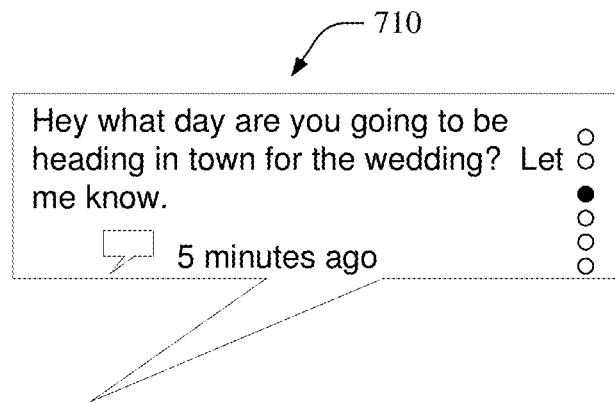
Figure 7C:
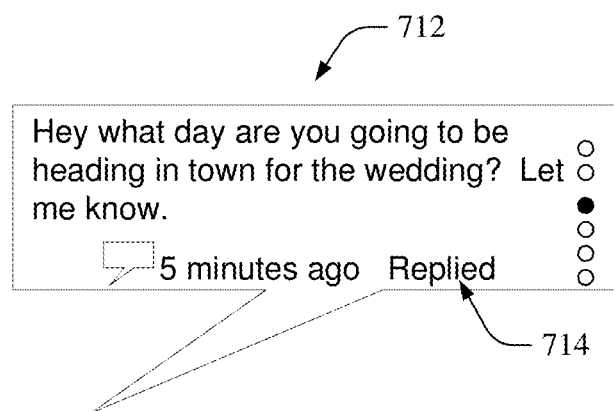

The message bubble 602 portion of the widget is shown in different states in FIGS. 7A, 7B and 7C. In FIG. 7A, a message bubble 700 having an unread direct message is shown. The message is an SMS or MMS message or any other type of message sent privately to the user via a social network. For unread messages, an indicator 702 that the message is new is displayed next to the activity source/timestamp information. A collapsing arrow 704 is provided for collapsing or expanding the message, vertical scroll bar or other vertical scroll control 706 is provided for vertically scrolling through one or more messages in the message bubble and a copy of the message 708 is shown in the message bubble as well.

In FIG. 7B, a message bubble 710 having a read direct message is shown. No indicator of a new message is included, contrary to that shown in message bubble 700. In some embodiments, the message is considered read once it has been viewed in the expanded state widget. However, in some embodiments, a message truncated because it is longer than the viewable area of the message bubble will not be considered read until a supporting application is launched to display the entire message. The supporting application can display the message such as that shown in FIGS. 9 and 10 (discussed in more detail below with reference to supporting applications component 208 of FIG. 2). In some embodiments, although not shown, the message can include "Read" text or any other indicator to indicator that the message has been read.

In FIG. 7C, once a direct message has had a reply transmitted, the message bubble can be as shown in message bubble 712. An indicator 714 indicator that a reply message has been transmitted can be displayed.

FIGS. 8A, 8B and 8C illustrate wallpaper and widget combinations on the communication device. At FIG. 8A, the wallpaper is shown indicating contact Allison having active social network activity (e.g., jumping fish) and an unread message (buoy) from Allison. The widget (shown as the contact strip) is in the collapsed state. Although not shown, in any of the embodiments illustrating contacts, the icon assigned to a contact can be shown below the contact for ease of identification by the user of the communication device. As such, in embodiments wherein a contact preselects his/her own icon, and sends the icon or information indicative of the icon to the user, the user can readily identify the contact based on the icon without resort to memorizing the identify of each contact for each icon.

At FIG. 8B, the user taps on (or otherwise activates) contact Allison to awake the widget with regard to Allison's activity. In this case, Allison sent SM information via a TWITTER® message 3 minutes ago and the SM information is shown by displaying the widget in the expanded state. At FIG. 8C, the user taps on another contact, Sarah, to view SM information and/or messages associated with Sarah. The user can flick the message bubble to vertically scroll through the message.

In some embodiments, group messaging (not shown) between two or more contacts can be facilitated. In this embodiment, multiple contacts (or indicia or animated icons representing contacts) can be shown via the UI. For example, in lieu of showing only a single contact on a screen such as that shown at FIG. 8C, multiple contacts can be shown on the screen. The screen can also display the social network activity and/or messaging between a group of contacts and the user and/or between contacts. As such, the user can monitor activity from multiple contacts of interest concurrently.

Turning back to FIG. 2, the UI component 214 also includes a supporting applications component 208. The supporting applications component 208 can provide a display of SM information and text messages upon activation of the widget discussed above with reference to FIGS. 5 and 6. For example, the supporting applications component 208 can control the display of the SM information, text messages and contact information and static icons for launching applications in three respective portions of the UI.

Figure 9:
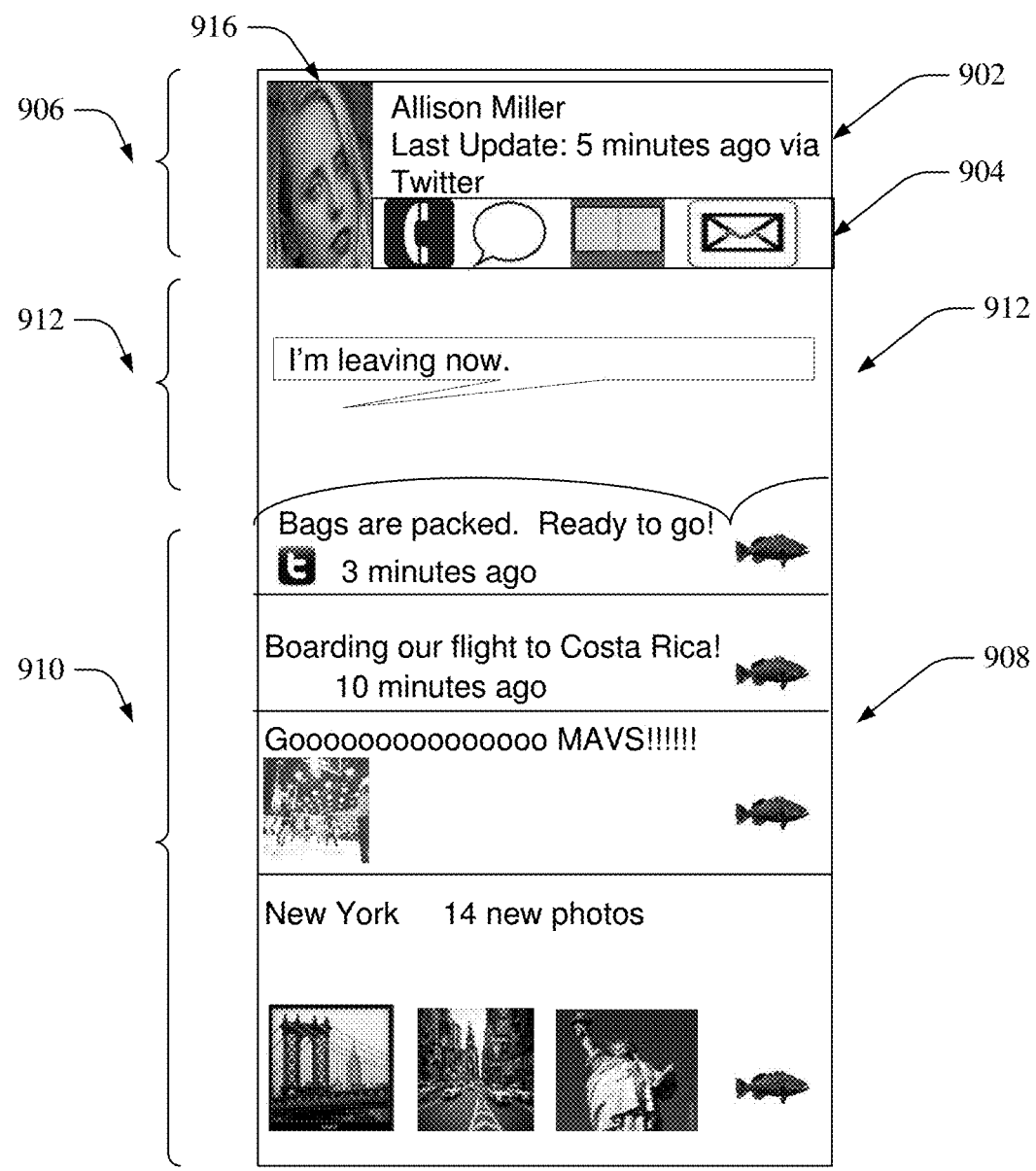
Figure 10:
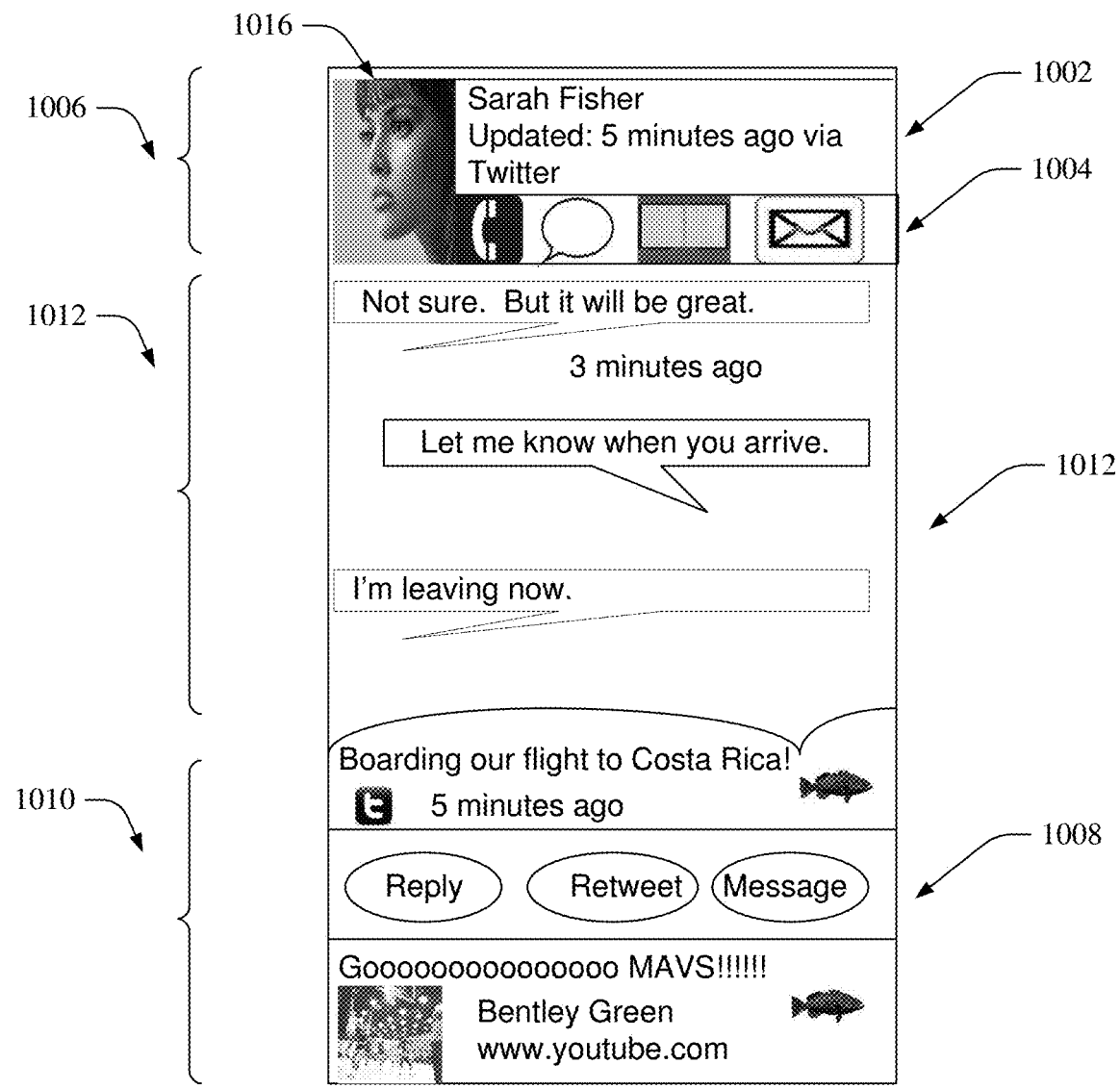

By way of example, but not limitation, FIGS. 9 and 10 illustrate displays controlled by the supporting applications component 208. As shown, contact information 902, 1002 and static icons 904, 1004 activatable for launching applications are displayed in a first portion 906, 1006 of the UI, SM information 908, 1008 is displayed in a second portion 910, 1010 of the UI, text messages (or private messages 912, 1012 sent to or from a SNS are displayed in a third portion 914, 1014 of the UI. Avatars or pictures 916, 1016 representing contacts are displayed in a fourth portion 918, 1018 of the UI. While the UI is shown with the arrangements of FIGS. 9 and 10, the SM information, messaging, contact information, static activatable for launching applications and/or the avatars and pictures need not be arranged as shown and can be arranged in any number of configurations such that different information is provided in different non-overlapping portions of the UI.

FIG. 11A illustrates activation of the supporting applications display of FIGS. 9 and 10. The supporting applications display is initiated for a contact based on the communication device detecting selection of the contact by the user of the communication device. In the embodiment shown, the contact is selected by tapping on the area of the UI that corresponds to the contact.

FIGS. 11B and 11C illustrate supporting applications displays once activated. For example, FIG. 11B shows text messaging in a region 1102 above the region 1104 for SM information. FIG. 11C shows the ability to drag up and down recent conversations and/or SM information and the ability to click on action bar including the static 1106 that are activatable to launch an application.

In some embodiments, a supporting applications component 208 (which will be discussed in detail below) can cause the UI to display one or more different views simultaneously or concurrently. The different views include a view of one or more contacts with which the communication device 202 is associated (or that are stored on or associated with the communication device 202). For example, a contact strip can display one or more images associated with a profile for contacts. The UI can detect input at the UI for launching other applications associated with the icon. For example, a phone icon in this display would launch a dialer application to initiate a call to one of the contacts. The telephone number called can be the telephone number associated with the contact and accessible by the communication device 202.

Another view can include a communications view that displays voice calls and/or messages. Another view can include a social activity view that can display SN activity from SN friends with which the user of the communication device 202 is associated. SN activity includes activity provided to or from a SNS, including, but not limited to, FACEBOOK®, TWITTER®, MYSPACE®, MY LIFE®, LINKEDIN®. The UI can also detect input at the UI for initiating an inline reply to the social network activity. For example, the social network activity can be a wall post and the UI can detect an input at the UI (e.g., touch input) selecting the wall post. Detection of the selection of the post can enable the messaging component 222 to initiate inline reply functionality for generating an inline reply to the wall post. The reply can then be posted at the SNS.

Turning back to FIG. 2, the messaging component 222 is configured to transmit and/or receive the messages associated with contacts. In some embodiments, messaging component 222 can provide one or more of the functions of the messaging component 108 of FIG. 1.

In some embodiments, the messaging component 222 can perform functions for replying to a message. In some embodiments, incoming messages can be identified and a determination can be made as to whether a user has interacted with the message via a native messaging application. Using the native messaging application can enable all types of MMS messages (e.g., slideshow, video, voice recording) to be seamlessly viewed.

In some embodiments, the messaging component 222 is configured to control the operation of one or more messaging applications. By way of example, but not limitation, messaging applications can include text-based, voice-based, video-based and/or combination voice and audio-based applications such as text messaging, instant messaging, private messages sent via SNSs, internet and landline telephony, and/or audio and textual voicemail communications. By way of other examples, but without limitation, messaging applications can include applications utilizing short message service (SMS), multimedia message service (MMS), instant messaging (IM) protocols and/or text over internet protocol (ToIP) messaging.

The messaging component 222 can be configured to receive inputs from the I/O component 216 and format, transmit and/or receive messaging content in response to the inputs received. The messaging content can include a threaded list of one or more messages or calls received at or transmitted from the communication device 202 for one or more contacts. The messages can be text messages, instant messages, email messages, voicemail messages or any other messages that can be provided to the user. The calls can be telephone calls communicated over PSTN networks, cellular networks and/or Internet telephony calls. The content of the messages and/or calls can be provided in message bubbles or other shapes or indicia and, in some embodiments, can be associated with or displayed with an identifier of the initiator of the messaging content. In some embodiments, the messaging component 222 can facilitate creation and transmission of a quick reply.

The contacts mechanism 224 can include the contacts component 226 for initiating the contacts application providing contacts information for a contact. In some embodiments, the contacts component 226 is configured to control the operation of one or more contact applications. The contact applications can provide and/or enable display, deletion or editing contacts-related information. By way of example, but not limitation, contacts-related information can include in case of emergency (ICE) information such as names and contact information of emergency contacts, information regarding allergies, medications and other health-related information provided by the owner of the communication device 202.

The contacts-related information can also include voice, email and/or geographical contact information for an individual or group in a contacts repository accessible by the communication device 202

In some embodiments, the contacts component 226 includes a built-in contacts sync mechanism that applications with a centralized API. This API allows for contacts to pull SM information from several different social networking accounts. The merge provides the ability to have a single view of a contact and all of the streams of SM information for the contact.

In some embodiments, a user can join social network friends with contacts in the communication device 202 contacts address book. After the SNS account has been verified and contacts have been synced, the user is signed into the SNS. The SNS contact list can display the SNS friends that are not joined with a contact in the communication device 202 address book. The user can then join the social network friend to the corresponding contact.

In some embodiments, the communication device can provide functionality for linking contacts, such as that described with reference to the SM component 232.

The contacts mechanism 224 can also include a data store component 230 for storing information associated with the contact. Such information can include, but is not limited to, animated icons, avatars and/or pictures assigned to a contact.

In some embodiments, the contacts repository can be included in the data store component 230 of the communication device 202. As such, the contacts-related information can be mobile, home, work and/or fax numbers, email addresses, physical street addresses, social network identification information, a social network identification, or the like. The contacts-related information can also include information about the individual or the group including, but not limited to, biographical information such as the birthday or date of incorporation of the individual and group, respectively, favorite foods of an individual and/or other information specific to the individual or group that the user of the communication device 202 can want to access. The contacts-related information can include information that the user has stored locally on the communication device 202 (e.g., in the address book of the communication device 202) and/or that the user can access from a location that is remote from the physical location of the communication device 202.

The communication device 202 also can include a processor 210. The processor 210 can enable the communication device 202 to process data relating to display and/or management of information, updating the wallpaper, activating or displaying widgets or static that can be activated to launch applications and/or provide news, weather, time or email information, displaying information on the UI, generating or displaying an overlay display region, generating or processing notifications and associated notification-related information, and the like. In some embodiments, the processor 210 can be configured to execute computer-executable instructions to perform one or more of the functions described herein for the communication device 202, and the memory 212 can store the computer-executable instructions and/or information for performing the operations described herein.

In various embodiments, the processor 210 can be configured to confer functionality, at least in part, to substantially any component within the communication device 202, in accordance with aspects of the subject innovation. As another example, the processor 210 can facilitate enabling the communication device 202 to process data (e.g., symbols, bits, or chips) for multiplexing/demultiplexing, modulation/demodulation, such as implementing direct and inverse fast Fourier transforms, selection of modulation rates, selection of data packet formats, inter-packet times, and the like.

In various embodiments, the communication device 202 can include a notification component 218. The notification component 218 can be configured to generate notifications from the communication device 202. The notification component 218 can be configured to automatically re-size notifications to fit the screen size for the communication device 202 in landscape (or portrait) orientation and/or based on whether a media is attached to the notification. For example, if media is attached to a notification, the media can be re-sized for presentation in a particular orientation.

The notification component 218 can also receive one or more notifications from one or more communication devices (e.g., mobile communication devices, application servers, social networking sites, etc.) or generate notifications relating to local applications (e.g., electronic calendar application, alarm clock application, etc.). The notification component 218 also can facilitate processing the received or generated notifications and associated notification-related information to facilitate presenting the notification and/or desired notification-related information to the communication device user via the UI (e.g., overlay display region) and/or associated UI components (e.g., speakers, vibration generator, etc.).

In various embodiments, notifications can include, but are not limited to, notifications indicating an alarm, missed alarm, message quick reply, a new message notification, low battery power, mute state, incoming call, volume, and/or system notifications. In various embodiments, the alarms and other notifications can be displayed or otherwise output from the communication device 202, and/or incoming calls can be received on the communication device 202, while the communication device 202 is in the timeout state.

In various embodiments, the communication device 202 can also include an overlay component 220. The overlay component 220 can control the display of an overlay of information on the UI of the communication device 202. An overlay component 220 can overlay alarms, notifications, text, animated or static icons and/or other information for the display and management of information described herein.

In some embodiments, the overlay can be a temporary overlay that is displayed during a time interval corresponding with an event. For example, indicia of an incoming message can be overlayed over other information displayed by the UI. The indicia of the incoming message can include any information for alerting a user that an incoming message is in progress and/or for displaying information about the incoming message. In some embodiments, the incoming message can include the name, telephone number associated with the message, date of the incoming message, time of the incoming message and/or text the entirety, or a portion, of the message. The overlay can be a temporary overlay that is displayed during a time interval that is concurrent with the time that the message is incoming. In some embodiments, information or indicia of the incoming message can be overlaid on the screen. In some embodiments, on-going calls and/or the timer counting down during the timeout state can be displayed in an overlay on the screen and/or overlaid on the previous content of the screen.

The communication device 202 can include a memory 212. The memory 212 can store information and/or settings and/or computer-executable instructions for performing one or more functions described herein for the communication device 202. In various embodiments, the memory 212 can store data structures (e.g., user data, application data, metadata); code structure(s) (e.g., modules, objects, classes, procedures) or instructions; message hashes; neighbor cell list; information relating to securing the communication device 202 and information associated therewith, displaying information in the UI display screen, generating or displaying an overlay display region, generating or processing notifications and associated notification-related information; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor 210 can be functionally coupled (e.g., through a memory bus) to the memory 212 in order to store and retrieve information (e.g., neighbor cell list; information relating to securing the communication device 202 and information associated therewith, displaying information in the UI display screen, generating or displaying an overlay display region, generating or processing notifications and associated notification-related information; frequency offsets; desired algorithms; etc.) desired to operate and/or confer functionality, at least in part, to, the messaging component 222, UI component 214, overlay component 220, notification component 218, SM component 232, contacts mechanism 224 and/or substantially any other operational aspects or components of the communication device 202.

The communication device 202 can also include a SM component 232 that can include multiple components for communicatively coupling the communication device 202 to the SNSs 260, 262, 264. In the embodiment shown, the SM component 232 includes a FACEBOOK® content component 234, TWITTER® content component 236 and any other content component for a SNS 238.

The content components can provide functionality for accessing and transmitting SM information between the SNSs 260, 262, 264 and the SM component 232 on individual connections as compared to an aggregated connection. As such, each of the FACEBOOK content component 234 and TWITTER content component 236, for example, transmit and receive only FACEBOOK and TWITTER SM, respectively. The connections are dedicated connections dedicated for a particular SNS.

In various embodiments, the SM component 232 is configured to control the receipt, aggregation, generation, output and/or filtering of SM information at the communication device 202. By way of example, but not limitation, SM information can include, but is not limited to, information associated with or output from SM feeds, blog information, chat information, instant messaging information, and the like. The SM information can be displayed in any number of arrangements including, but not limited to, the subject matter of the SM feed, the social networking site from which the SM feed is provided and/or the chronological order of the SM feeds. In some embodiments, the SM information can include comments posted (or a number of comments posted) in association with one or more SM feeds for the individual. In some embodiments, one or more comments can be shown on the UI with the one or more feeds. The SM applications can include applications that provide social media feeds, news feeds and wall postings from FACEBOOK®, activity updates (e.g., tweets) from TWITTER® or other information from SNSs such as MYSPACE®, websites of interest and the like.

Turning to the SNG component 250, the SNG component 250 can be configured to communicate with the SNSs 260, 262, 264. The SNG component 250 can transmit information to the SNSs 260, 262, 264 and/or receive information from the SNSs 260, 262, 264.

The SNSs 260, 262, 264 can be the FACEBOOK® SNS, TWITTER® SNS and/or MYSPACE® SNS in various embodiments. In other embodiments, the SNSs can be any sites from which SM information can be retrieved by the communication device 202, including, but not limited to, the LINKEDIN (and design)® SNS, the MYLIFE® SNS and the like. In some embodiments, the communication device 202, the internet 240 and the SNG component 250 (and in various embodiments, one or more of the SNSs 260, 262, 264) can be communicatively coupled to one another to perform the functions of system 200 described herein.

In some embodiments, the SNG component 250 can provide a gateway between the SNSs 260, 262, 264 and the SM component 232 of the communication device 202. The SNG component 250 can receive SM information from the SNSs 260, 262, 264 and transmit the information to the communication device 202 (and/or the SM component 232 of the communication device 202). The SM component 232 can aggregate the SM information from the SNSs 260, 262, 264 and, as such, connecting to the SNG component 250 can provide a single connection for the communication device 202 over which the communication device 202 can assemble and optimize data and other SM feeds. In some embodiments, the data and SM feeds can be in the network and/or in the cloud.

In some embodiments, in lieu of or in addition to employing the connection between the SNG component 250 and the SM component 232 to provide aggregated SM information, the system 200 can include a framework whereby individual connections are provided from the SNSs 260, 262, 264 to the communication device 202. In some embodiments, available public application programming interfaces (APIs) can be employed to assemble data and/or SM feeds on the communication device 202. As such, the communication device 202 can be configured to retrieve information from the SNSs 260, 262, 264 and/or to provide information to the SNSs 260, 262, 264 using native APIs.

In embodiments of the system 200 that include the SNG component 250, the SNG component 250 can include hardware, software and/or a combination of hardware and software for providing communication between the SNSs 260, 262, 264 and the communication device 202. In various embodiments, the SNG component 250 can be a network server with which the communication device 202 is communicatively coupled. In some embodiments, the SNG component 250 can be located on a first network with the communication device 202 and the SNSs 260, 262, 264 can be located on a second network. The second network can be included in the internet 240 in some embodiments.

By way of example, but not limitation, in some embodiments, credentials for the communication device 202 to sign-in to or connect to or retrieve information from a SNS can be received at the communication device 202 and output to the SNG component 250. The SNG component 250 can be configured to receive the credential information and output the credentials to the SNS of interest.

By way of other examples, but not limitation, the SNG component 250 can be configured to perform registration of the communication device 202, transmit login and logoff information for the user of the communication device 202 from the SNSs 260, 262, 264, retrieve data and/or feeds from the SNSs 260, 262, 264, retrieve SN contact activity information (e.g., notifications, status updates, wall postings, changes to SM profile information, photos, avatars and the like).

In various embodiments as described herein and with reference to any number of different applications including, but not limited to, a messaging application, a contacts application and/or a social media application, where an entity, person or individual is discussed, the entity, person or individual can be a legal or natural entity, person or individual. Similarly, in various embodiments as described herein and with reference to any number of different applications including, but not limited to, a messaging application, a contacts application and/or a social media application, where an entity or group is discussed herein, the entity or group can include one or more legal or natural entities, persons or individuals. By way of example, but not limitation, an entity or group could be an organization, a business entity, a group of humans, and/or a group including a legal and a natural person or entity.

Figure 12:
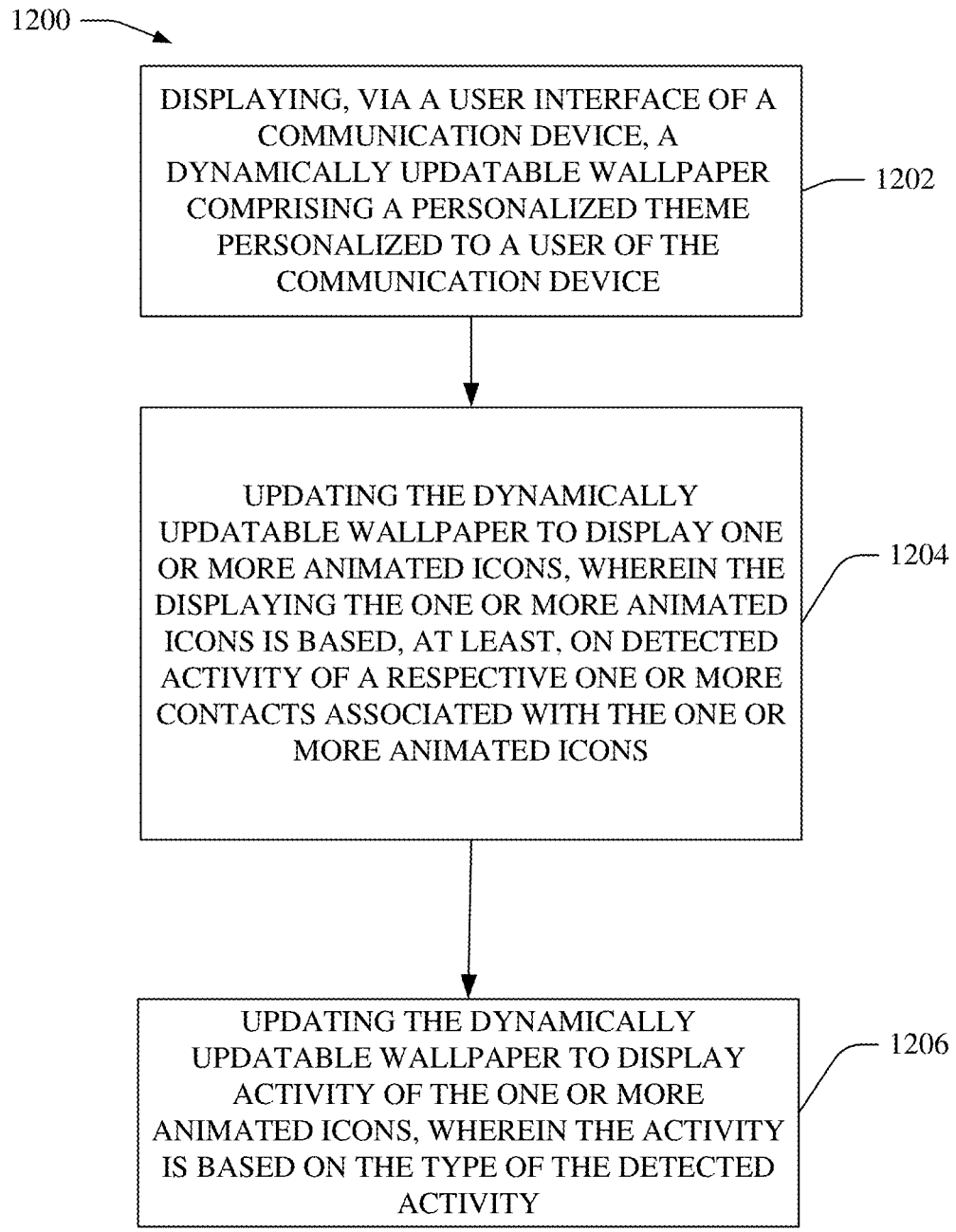
FIGS. 12, 13, 14 and 15 illustrate flowcharts of exemplary methods for facilitating display and management of information at a communication device in accordance with various aspects and embodiments described herein.

Turning now to methods 1200, 1300, 1400 and 1500, FIGS. 12, 13, 14 and 15 illustrate flowcharts of exemplary methods for facilitating display and management of information at a communication device in accordance with various aspects and embodiments described herein. Referring first to FIG. 12, at 1202, method 1200 can include displaying, via a user interface of a communication device, a dynamically updatable wallpaper comprising a personalized theme personalized to a user of the communication device. At 1204, method 1200 can include updating the dynamically updatable wallpaper to display one or more animated icons, wherein the displaying the one or more animated icons is based, at least, on detected activity of a respective one or more contacts associated with the one or more animated icons.

The animated icons can be associated with different contacts. The animated icons can be associated by the user of the communication device at time of device setup and/or as new contacts are made or the user determines that a contact is a favorite contact or of a high enough level of contact (or that there is a great enough interest by the user of watching the social network activity and/or being alerted of messages for the contact) that assigning the contact to an icon is warranted. In some embodiments, up to five contacts can be assigned to icons. In other embodiments, any number of contacts can be assigned to icons, limited only by the display area of the wallpaper for the communication device.

By way of example, but not limitation, if social network activity is detected for a first contact, the icon can be displayed on the wallpaper and if social network activity is detected for a second contact, a second icon can be displayed. As shown in FIG. 4B, the icon can be a fish, for example, with one fish representing a first contact and a second fish (such as that shown in 4C) representing activity of two contacts.

In some embodiments, at 1206, method 1200 can include updating the dynamically updatable wallpaper to display activity of the one or more animated icons, wherein the activity is based on the type of the detected activity. The activity can be indicative of detected social network activity. The activity can be indicative of a read or unread state of messages.

The activity can be any of a number of different types of movements or visualizations of the animated icons. For example, when social network activity is detected, the icon can be displayed jumping. With reference to FIG. 4B, the fish icon can leap out of the water when social network activity for the associated contact is detected.

Figure 13:
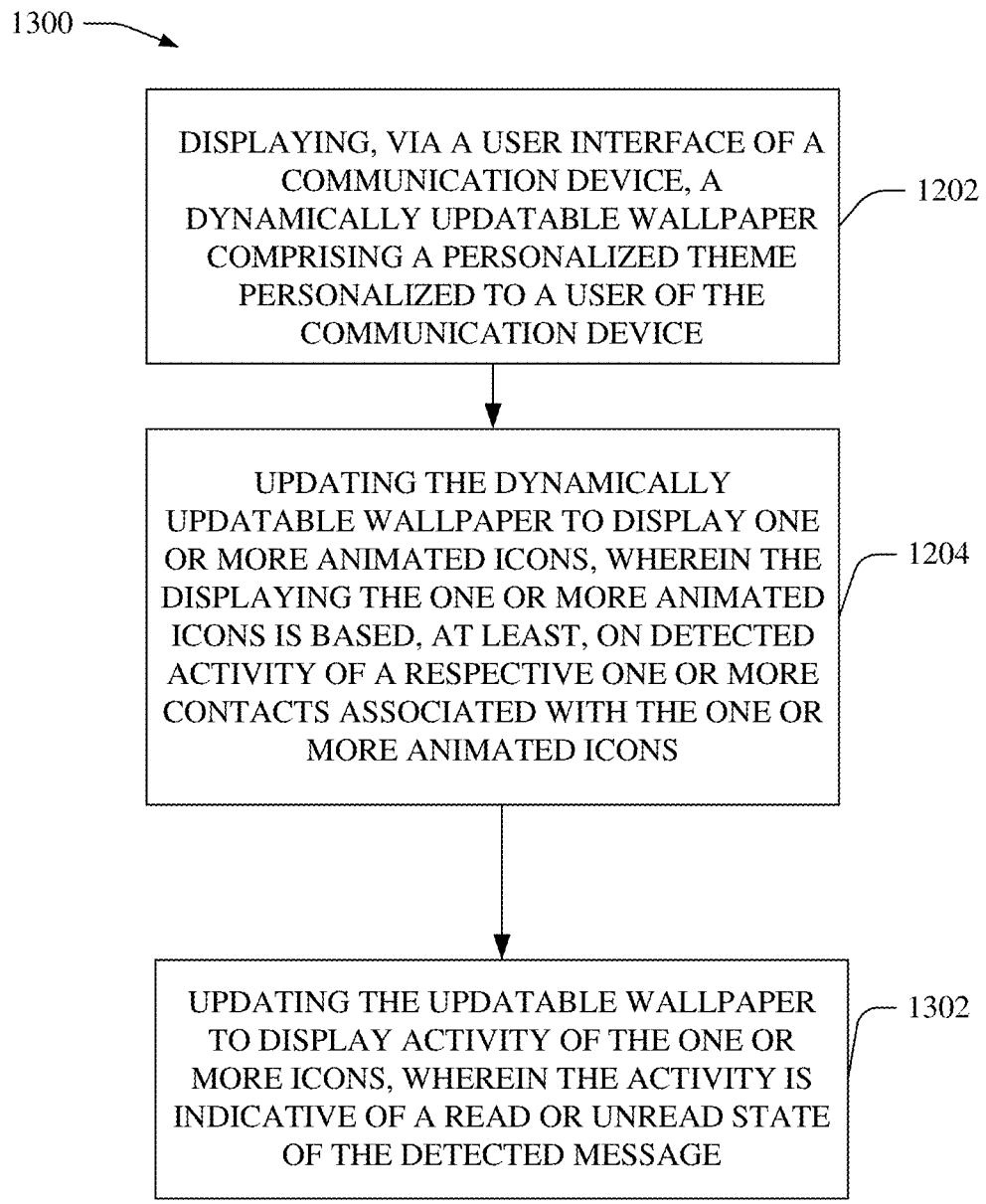

Turning now to FIGS. 13, 1202 and 1204 can be as described with reference to FIG. 12. At 1302, method 1300 can include updating the dynamically updatable wallpaper to display activity of the one or more animated icons, wherein the activity is indicative of a read or unread state of the detected message. For example, in some embodiments, when a message is received for a contact, the icon associated with the contact may be displayed as performing an action repeatedly until the message is read (e.g., jumping, blinking, turning, or any other repeated action). By contrast, in some embodiments, when a message is read and there is no recent social network activity for a contact, the icon associated with the contact can be displayed having a non-repetitive activity and/or being located in a certain region in the wallpaper. For example, the icon can be a fish in water and can be displayed under water when there is no recent social activity and/or all messages have been read from the contact.

Figure 14:
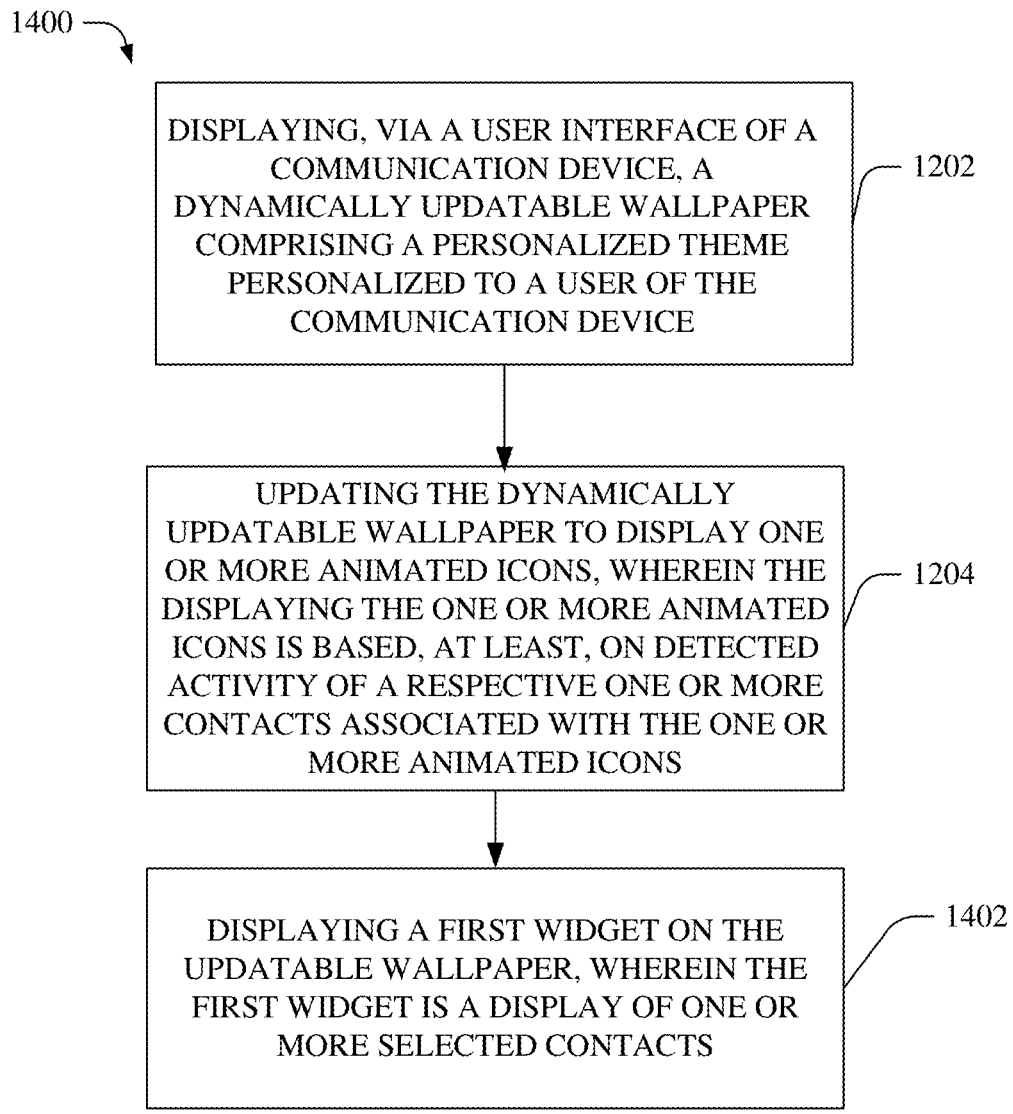

Turning now to FIGS. 14, 1202 and 1204 can be as described with reference to FIG. 12. At 1402, method 1400 can include displaying a widget on the dynamically updatable wallpaper. The widget can be a display of one or more contacts. For example, the widget can be a strip displaying one or more contacts (or avatars or other images or information representing the contacts). For example, the strip can be as shown in FIG. 5 or 6. In another example, the strip can be vertical, diagonal, circular or any number of other shapes. In another example, the widget is merely an arrangement of one or more contacts, and need not be formed into a contiguous strip of any shape. For example, the widget could be displayed as a random arrangement of avatars on the wallpaper.

The widget can be displayed in a collapsed state in which social media (SM) information associated with a contact and/or text messages associated with a contact are not displayed. Rather, in this embodiment, the widget merely displays one or more contacts and indicia of a number of messages or amount of social network activity associated with each of the one or more contacts. As shown in FIGS. 5 and 8A, the widget can be displayed as pictures of the one or more contacts and, as shown at contact Allison, a number of messages received from or transmitted to Allison.

The widget can also be displayed in an expanded state displaying the one or more contacts and one or more of the messages or SM information associated with the one or more contacts. This embodiment can be as shown in FIGS. 6, 8B and 8C.

Figure 15:
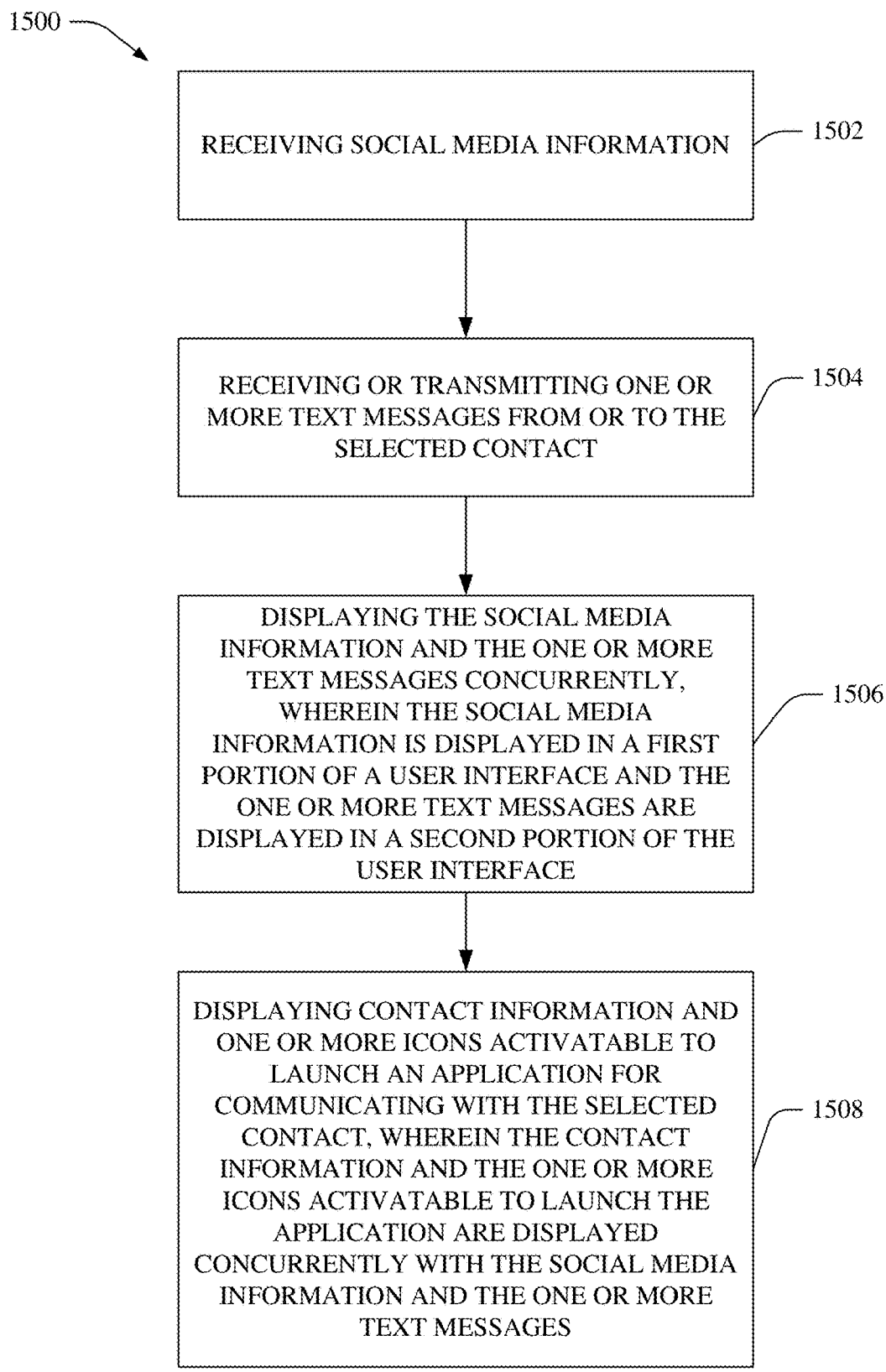

FIG. 15 is another method of facilitating display and management of information at a communication device in accordance with various aspects and embodiments described herein. At 1502, method 1500 can include receiving SM information associated with a selected contact. The SM information can be received at a communication device.

At 1504, method 1500 can include receiving or transmitting one or more text messages from or to the selected contact. At 1506, method 1500 can include displaying the SM information and the one or more text messages concurrently. The concurrently displayed SM information and text messages can be displayed on a single UI of the communication device. For example, the dynamically updatable wallpaper can be updated to display the SM information and the text messages associated with a particular contact. In one embodiment, the SM information is displayed in a first portion of a UI and the one or more text messages are displayed in a second portion of the UI. In some embodiments, for example, a portion of the wallpaper can be designated to be updated to display SM information and not text messages. By contrast, another portion of the wallpaper can be designated to display text messages and not SM information. The embodiment can be as shown in FIGS. 9 and 10 with the SM information in a middle portion of the wallpaper and the text messages in a lower portion of the wallpaper and just above an avatar or picture associated with the contact. The text messages can be a history of the most recent text messages transmitted to and/or received from the contact to which the text messages are visually associated. In some embodiments that display more than one contact on the wallpaper, the contact for which SM information or text messages are displayed can be indicated by highlighting a portion of the contact avatar or picture, displaying a picture curl on the avatar or picture of any other way of differentiating the contact from the other contacts displayed.

At 1508, method 1500 can include displaying contact information and one or more static icons activatable to launch an application for communicating with the selected contact. The contact information and the one or more static icons activatable to launch the application can be displayed concurrently with the SM information and the one or more text messages. For example, the contact information and one or more static icons activatable to launch an application can be displayed at a top portion of the wallpaper as shown in FIGS. 9 and 10. The application can be an application to launch a telephone call to the contact for which SM information and/or text messages are displayed, to initiate an email, to initiate an SMS, MMS or other text message, to launch a contacts application displaying the contacts page for the contact, to launch a SNS or the like.

The embodiments described above are merely exemplary and the portions of the UI (or wallpaper) displaying the SM information, text messages, and contact information and static icons activatable to launch an application can be in any non-overlapping portions of the UI, as dictated by the communication device designer and/or as configured by the user of the communication device.

In various embodiments, the messages described herein can be TWITTER®, instant message, SMS or MMS messages or any number of other different types of text messages.

In the embodiments described in methods 1200, 1300, 1400 and 1500, in some cases, the dynamically updatable wallpaper further comprises an icon activatable to display information on the dynamically updatable wallpaper. The information can be news, weather, time or other information. In some embodiments, the information can be email information and/or a text box or other mechanism for creating an email.

Figure 18:
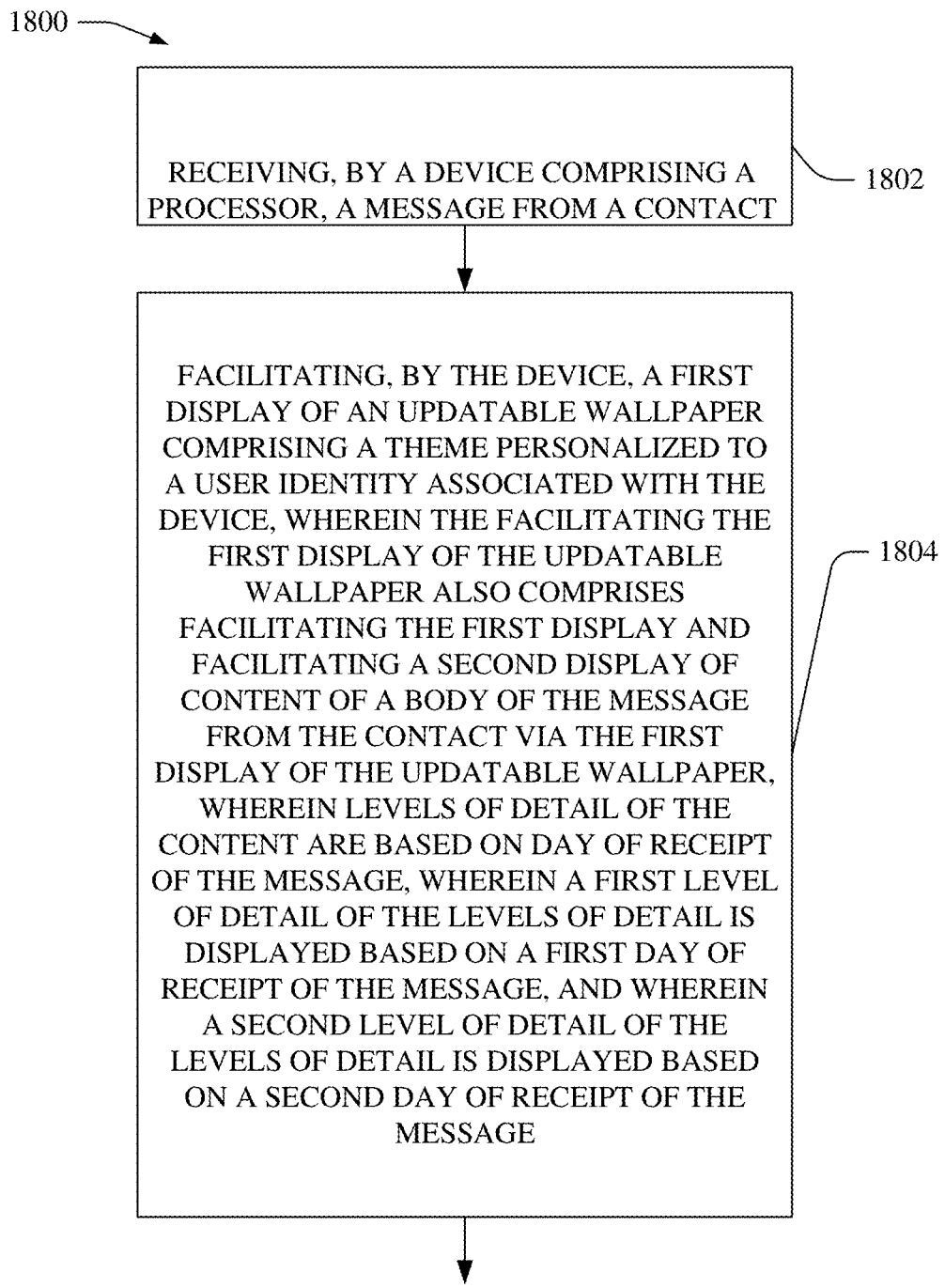
FIG. 18 illustrates a flowchart of an exemplary method for facilitating display and management of information at a communication device in accordance with various aspects and embodiments described herein.

At FIG. 18, method 1800 is shown. At 1802, method 1800 can comprise receiving, by a device comprising a processor, a message from a contact. At 1804, method 1800 can comprise facilitating, by the device, a first display of an updatable wallpaper comprising a theme personalized to a user identity associated with the device, wherein the facilitating the first display of the updatable wallpaper also comprises facilitating the first display and facilitating a second display of content of a body of the message from the contact via the first display of the updatable wallpaper, wherein levels of detail of the content are based on day of receipt of the message, wherein a first level of detail of the levels of detail is displayed based on a first day of receipt of the message, and wherein a second level of detail of the levels of detail is displayed based on a second day of receipt of the message.

Figure 16:
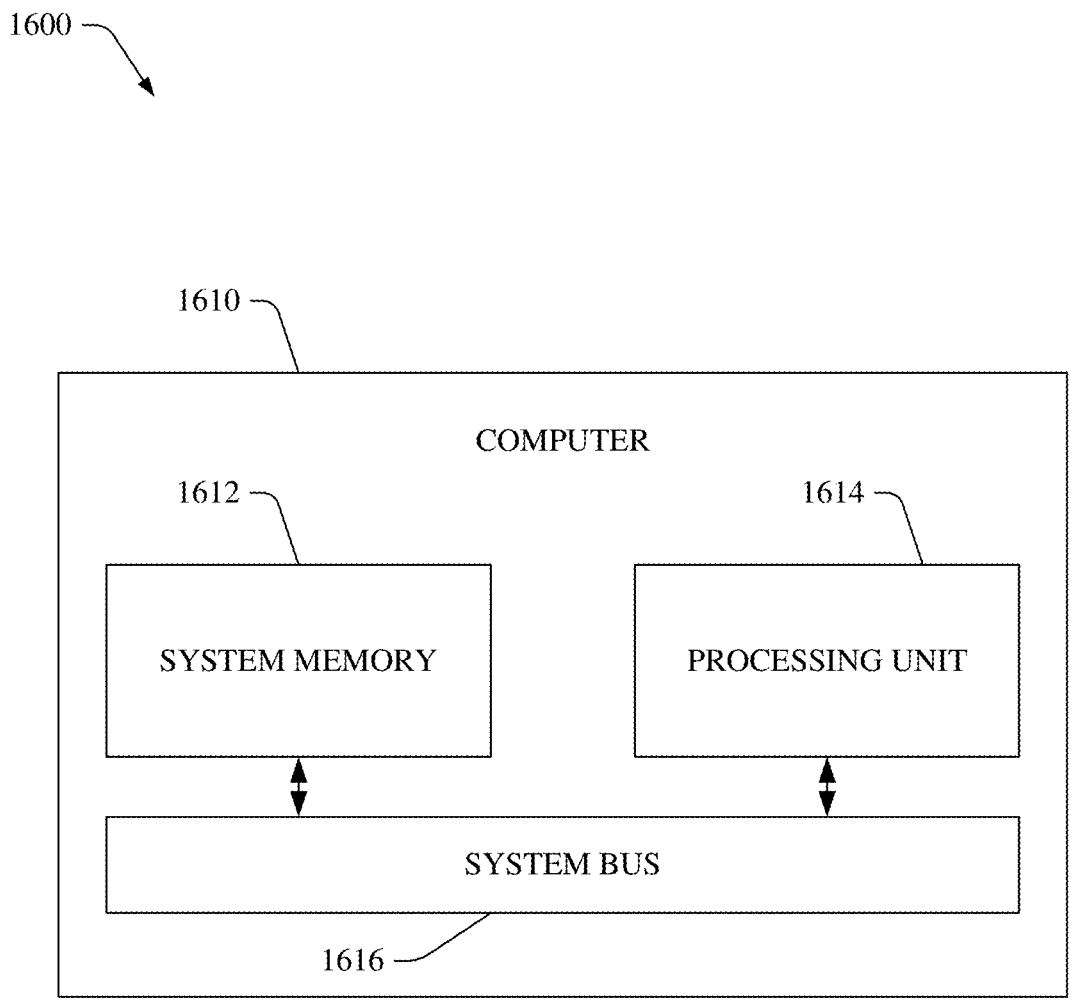
FIG. 16 illustrates an exemplary operating environment facilitating the systems, apparatus, methods and computer-readable storage media described herein.

FIG. 16 illustrates an exemplary operating environment that facilitates the systems, apparatus, methods and computer-readable storage media described herein. In order to provide additional context for various aspects of the embodiments described herein, FIG. 16 and the following discussion are intended to provide a brief, general description of a computing environment 1600 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any suitable media that can be accessed by the computer and includes both volatile and non-volatile media, removable and non-removable media, and can be implemented in any method or technology for storage of information such as computer-readable instructions, data structures, program modules or other data. Computer storage media includes, but is not limited to, read-only memory (ROM), random access memory (RAM), Electrically Erasable Programmable Read-Only Memory (EEPROM), flash memory or other memory technology, compact disc read-only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information and which can be accessed by one or more computing devices, or other storage devices. Combinations of any of the above are also included within the scope of computer-readable media.

In accordance with various aspects, the computing environment 1600 for implementing various aspects includes a computer 1610, the computer 1610 including a processing unit 1614, a system memory 1612 and a system bus 1616. The system bus 1616 couples system components including, but not limited to, the system memory 1612 to the processing unit 1614. The processing unit 1614 can be any of various commercially available processors, such a single core processor, a multi-core processor, or any other suitable arrangement of processors. The system bus 1616 can be any of several types of bus structure that can further interconnect to a memory bus (with or without a memory controller), a peripheral bus, and a local bus using any of a variety of commercially available bus architectures. The system memory 1612 can include ROM, random access memory RAM, high-speed RAM (such as static RAM), erasable programmable read only memory (EPROM), EEPROM, flash memory, and/or the like. Additionally or alternatively, the computer 1602 can include a hard disk drive, upon which program instructions, data, and the like can be retained. Moreover, removable data storage can be associated with the computer 1610. Hard disk drives, removable media, computer-readable storage media, etc. can be communicatively coupled to the processing unit 1614 by way of the system bus 1616.

The system memory 1612 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1610 through one or more wired/wireless input devices, such as a keyboard, pointing and clicking mechanism, pressure sensitive screen, microphone, joystick, stylus pen, etc. A monitor or other type of interface can also be connected to the system bus 1616.

The computer 1610 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1610 can connect to other devices/networks by way of antenna, port, network interface adaptor, wireless access point, modem, and/or the like.

The computer 1610 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and BLUETOOTH® wireless technologies. Thus, the communication can be a predefined structure as with a conventional network or simply an ad hoc communication between at least two devices.

WiFi allows connection to the Internet from a desired location (e.g., couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11 (a, b, g, etc.) to provide secure, reliable, fast wireless connectivity. A WiFi network can be used to connect communication devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 17:
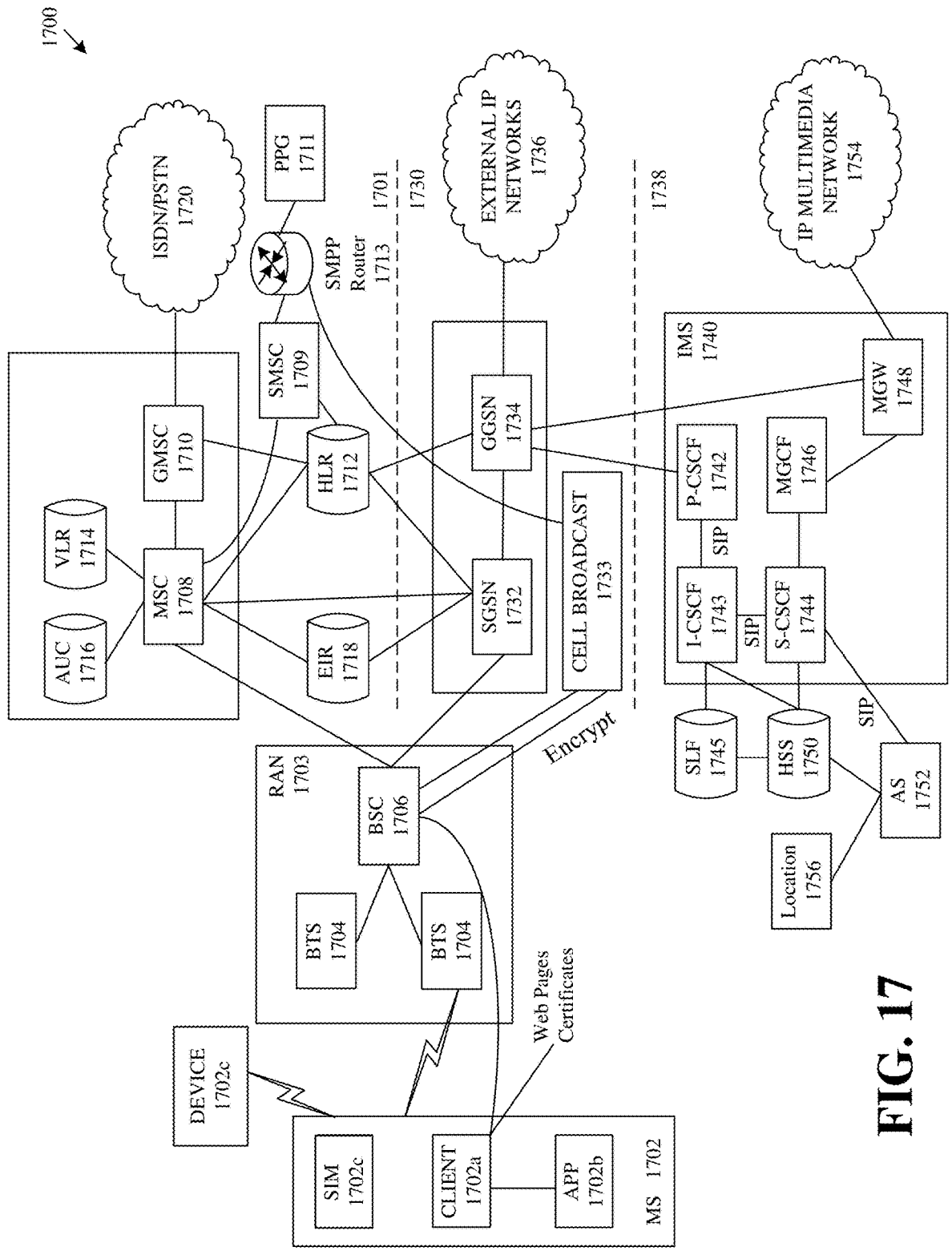
FIG. 17 illustrates an exemplary network environment facilitating the systems, apparatus, methods and computer-readable storage media described herein.

FIG. 17 illustrates an exemplary network environment that facilitates the systems, apparatus, methods and computer-readable storage media described herein. FIG. 17 depicts a GSM/General packet radio service (GPRS)/IP multimedia network architecture 1700 that includes a GSM core network 1701, a GPRS network 1740 and an IP multimedia network 1738. The GSM core network 1701 includes a Mobile Station (MS) 1714, at least one Base Transceiver Station (BTS) 1704 and a Base Station Controller (BSC) 1706. The MS 1714 is physical equipment or Mobile Equipment (ME), such as a mobile phone or a laptop computer that is used by mobile subscribers, with a Subscriber identity Module (SIM) 1714c. The SIM 1714c includes an International Mobile Subscriber Identity (IMSI), which is a unique device identifier of a subscriber. The MS 1714 includes an embedded client 1714a that receives and processes messages received by the MS 1714. The embedded client 1714a can be implemented in JAVA and is discuss more fully below.

The embedded client 1714a communicates with an application (APP) 1714b that provides services and/or information to an end user. One example of the application can be navigation software that provides near real-time traffic information that is received via the embedded client 1714a to the end user. The navigation software can provide road conditions, suggest alternate routes, etc., based at least in part on the location of the MS 1714. Those of ordinary skill in the art understand that there are many different methods and systems of locating an MS 1714.

Alternatively, the MS 1714 and a device 1714c can be enabled to communicate via a short-range wireless communication link, such as BLUETOOTH® technologies. For example, a BLUETOOTH® SIM Access Profile can be provided in an automobile (e.g., device 1714c) that communicates with the SIM 1714c in the MS 1714 to enable the automobile's communications system to pull information from the MS 1714. The BLUETOOTH® communication system in the vehicle becomes an "embedded phone" that employs an antenna associated with the automobile. The result is improved reception of calls made in the vehicle. As one of ordinary skill in the art would recognize, an automobile is one example of the device 1714c. There can be an endless number of devices 1714c that use the SIM within the MS 1714 to provide services, information, data, audio, video, etc. to end users.

The BTS 1704 is physical equipment, such as a radio tower, that enables a radio interface to communicate with the MS. Each BTS can serve more than one MS. The BSC 1706 manages radio resources, including the BTS. The BSC can be connected to several BTSs. The BSC and BTS components, in combination, are generally referred to as a base station (BSS) or radio access network (RAN) 1703.

The GSM core network 1701 also includes a Mobile Switching Center (MSC) 1708, a Gateway Mobile Switching Center (GMSC) 1710, a Home Location Register (HLR) 1712, Visitor Location Register (VLR) 1714, an Authentication Center (AuC) 1718, and an Equipment Identity Register (EIR) 1716. The MSC 1708 performs a switching function for the network. The MSC also performs other functions, such as registration, authentication, location updating, handovers, and call routing. The GMSC 1710 provides a gateway between the GSM network and other networks, such as an Integrated Services Digital Network (ISDN) or Public Switched Telephone Networks (PSTNs) 1720. In other words, the GMSC 1710 provides interworking functionality with external networks.

The HLR 1712 is a database or component(s) that comprises administrative information regarding each subscriber registered in a corresponding GSM network. The HLR 1712 also includes the current location of each MS. The VLR 1714 is a database or component(s) that contains selected administrative information from the HLR 1712. The VLR contains information necessary for call control and provision of subscribed services for each MS currently located in a geographical area controlled by the VLR. The HLR 1712 and the VLR 1714, together with the MSC 1708, provide the call routing and roaming capabilities of GSM. The AuC 1716 provides the parameters needed for authentication and encryption functions. Such parameters allow verification of a subscriber's identity. The EIR 1718 stores security-sensitive information about the mobile equipment.

A Short Message Service Center (SMSC) 1709 allows one-to-one Short Message Service (SMS) messages to be sent to/from the MS 1714. A Push Proxy Gateway (PPG) 1711 is used to "push" (e.g., send without a synchronous request) content to the MS 1714. The PPG 1714 acts as a proxy between wired and wireless networks to facilitate pushing of data to the MS 1714. A Short Message Peer to Peer (SMPP) protocol router 1713 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1714 sends a location update including its current location information to the MSC/VLR, via the BTS 1704 and the BSC 1706. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1740 is logically implemented on the GSM core network architecture by introducing two packet-switching network nodes, a serving GPRS support node (SGSN) 1732, a cell broadcast and a Gateway GPRS support node (GGSN) 1734. The SGSN 1732 is at the same hierarchical level as the MSC 1708 in the GSM network. The SGSN controls the connection between the GPRS network and the MS 1714. The SGSN also keeps track of individual MS's locations and security functions and access controls.

A Cell Broadcast Center (CBC) 1733 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1734 provides a gateway between the GPRS network and a public packet network (PDN) or other IP networks 1736. In embodiments, the GGSN provides interworking functionality with external networks, and sets up a logical link to the MS through the SGSN. When packet-switched data leaves the GPRS network, it is transferred to an external Transmission Control Protocol (TCP)-IP network 1736, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1740 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (e.g., voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vice versa.

The IP multimedia network 1738 was introduced with 3GPP Release 5, and includes an IP multimedia subsystem (IMS) 1750 to provide rich multimedia services to end users. A representative set of the network entities within the IMS 1750 are a call/session control function (CSCF), a media gateway control function (MGCF) 1746, a media gateway (MGW) 1748, and a master subscriber database, called a home subscriber server (HSS) 1750. The HSS 1750 can be common to the GSM network 1701, the GPRS network 1740 as well as the IP multimedia network 1738.

The IP multimedia system 1750 is built around the call/session control function (CSCF), of which there are three types: an interrogating CSCF (I-CSCF) 1743, a proxy CSCF (P-CSCF) 1742, and a serving CSCF (S-CSCF) 1744. The P-CSCF 1742 is the MS's first point of contact with the IMS 1750. The P-CSCF 1742 forwards session initiation protocol (SIP) messages received from the MS to an SIP server in a home network (and vice versa) of the MS. The P-CSCF 1742 can also modify an outgoing request according to a set of rules defined by the network operator (e.g., address analysis and potential modification).

The I-CSCF 1743 forms an entrance to a home network and hides the inner topology of the home network from other networks and provides flexibility for selecting an S-CSCF.

The I-CSCF 1743 can contact a subscriber location function (SLF) 1745 to determine which HSS 1750 to use for the particular subscriber, if multiple HSS 1750 are present. The S-CSCF 1744 performs the session control services for the MS 1714. This includes routing originating sessions to external networks and routing terminating sessions to visited networks. The S-CSCF 1744 also decides whether an application server (AS) 1752 is required to receive information on an incoming SIP session request to ensure appropriate service handling. This decision is based on information received from the HSS 1750 (or other sources, such as an application server 1752). The AS 1752 also communicates to a location server 1756 (e.g., a Gateway Mobile Location Center (GMLC)) that provides a position (e.g., latitude/longitude coordinates) of the MS 1714.

The HSS 1750 contains a subscriber profile and keeps track of which core network node is currently handling the subscriber. It also supports subscriber authentication and authorization functions (AAA). In networks with more than one HSS 1750, a subscriber location function provides information on the HSS 1750 that contains the profile of a given subscriber.

The MGCF 1746 provides interworking functionality between SIP session control signaling from the IMS 1750 and ISDN User Part (ISUP)/Bearer Independent Call Control (BICC) call control signaling from the external GSTN networks (not shown). It also controls the media gateway (MGW) 1748 that provides user-plane interworking functionality (e.g., converting between Adaptive Multi-Rate (AMR)- and Pulse-code modulation (PCM)-coded voice). The MGW 1748 also communicates with other IP multimedia networks 1754.

In some embodiments, the IP networks 1736 described herein include networks communicatively coupled to social networking sites. As such, the networks disclosed herein can also include such IP networks 1736 and one or more social networking sites.

It is to be appreciated and understood that components (e.g., UE, AP, core network, security component, UI, overlay component, etc.), as described with regard to a particular system or methodology, can include the same or similar functionality as respective components (e.g., respectively named components, similarly named components) as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

In the subject specification, terms such as "data store," data storage," "database," "repository", and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include ROM, programmable ROM (PROM), EPROM, EEPROM, phase change memory (PCM), flash memory, or nonvolatile RAM (e.g., ferroelectric RAM (FeRAM)). Volatile memory can include RAM, which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "interface," "module," and the like can refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. As another example, an interface can include input/output (I/O) components as well as associated processor, application and/or API components, and can be as simple as a command line or as complex as an Integrated Development Environment (IDE). Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

Furthermore, the embodiments can or can be implemented as a method, apparatus or article of manufacture using standard programming and/or engineering techniques to produce software, firmware, hardware, or any combination thereof to control a computer, apparatus or article of manufacture to implement the functionality disclosed herein. The term "article of manufacture," as used herein, is intended to encompass a computer program, or computer program product, accessible from any computer-readable device, computer-readable carrier, computer-readable media or computer-readable storage media. Computer-readable storage media can include, but are not limited to, magnetic storage devices (e.g., hard disk, floppy disk, magnetic strip), optical disks (e.g., compact disk (CD), DVD, Blu-ray disc (BD), . . . ), smart cards, and/or flash memory devices (e.g., card, stick, key drive). Additionally it should be appreciated that a carrier wave can carry computer-readable electronic data (e.g., the data transmitted and received via email and/or to access the Internet or a network such as a LAN). As known to those of ordinary skill in the art, modifications can be made to the above embodiments without departing from the spirit of the disclosure.

Moreover, the word "exemplary" is used herein to mean an example, instance or illustration. Any aspect or design described herein as "exemplary" is not to be construed as preferred or advantageous over other aspects or designs. Rather, use of the word "exemplary" is merely intended to present examples of embodiments. Further, as used herein, the term "or" is intended to mean an inclusive "or" rather than an exclusive "or". That is, unless specified otherwise, or clear from context, "X employs A or B" is intended to mean any of the inclusive permutations (e.g., X employs A, X employs B, X employs A and B). In addition, the articles "a" and "an," as used herein, should be construed to mean "one or more" unless, as specified otherwise, or clear from context, the articles are directed to only a singular form.

As used herein, the terms "infer" or "inference" refer generally to the process of reasoning about or inferring states of the system, apparatus, method, environment, and/or user from a set of observations as captured via events and/or data. By way of examples, but not limitation, inference can be employed to identify a specific context or action, or can generate a probability distribution over states. The inference can be probabilistic (e.g., the computation of a probability distribution over states of interest based on a consideration of data and events). Inference can also refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources.

What has been described above includes embodiments of claimed subject matter. It is, of course, not possible to describe every conceivable combination of components or methodologies for purposes of describing the claimed subject matter. However, one of ordinary skill in the art can recognize that many further combinations and permutations of such subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
 receiving, by a device comprising a processor, a message from a contact; and
 facilitating, by the device, a first display of an updatable wallpaper comprising a theme personalized to a user identity associated with the device, wherein the first display of the updatable wallpaper comprises a display of text dictated by the theme, wherein the facilitating the first display of the updatable wallpaper also comprises facilitating the first display and facilitating a second display of content of a body of the message from the contact via the first display of the updatable wallpaper;

determining, by the device, a day of receipt of the message;

comparing, by the device, the day of receipt of the message to a preference for privacy, wherein levels of detail of the content are based on the day of receipt of the message and a result of the comparing of the day of receipt with the preference for privacy;

displaying, by the device, a first level of detail of the levels of detail based on a first day of receipt of the message and the comparing or displaying, by the device, a second level of detail of the levels of detail based on a second day of receipt of the message and the comparing, wherein the levels of detail of the content being displayed provide differing levels of the privacy of the content.

2. The method of claim 1, further comprising updating, by the device, the updatable wallpaper based on a detected activity of the contact, wherein the theme comprises a poster and the activity comprises a new horizontal row of the text above a previous row of text forming an image of the poster with horizontal rows of wording in which the rows represent different activity.

3. The method of claim 2, wherein the updating is based on a detected social network activity of the contact.

4. The method of claim 1, further comprising updating, by the device, the updatable wallpaper, wherein the updating the updatable wallpaper comprises updating the updatable wallpaper to display an activity of an animated icon displayed as part of the wallpaper.

5. The method of claim 4, wherein the theme comprises animated icons, comprising the animated icon displayed as part of the wallpaper, following a defined trajectory.

6. The method of claim 1, wherein the updatable wallpaper further comprises an icon activatable to display weather information on the updatable wallpaper.

7. The method of claim 1, further comprising facilitating, by the device, displaying a widget on the updatable wallpaper, wherein the widget enables information associated with the contact to be displayed.

8. The method of claim 7, wherein the widget is displayed while the contact and an indication of a number of messages associated with the contact are concurrently displayed.

9. The method of claim 7, further comprising updating, by the device, the updatable wallpaper, wherein the updating the updatable wallpaper comprises updating the updatable wallpaper to display an activity of a first animated icon displayed as part of the wallpaper, and wherein the contact is displayed as a static representation of a second animated icon associated with the selected contact.

10. An apparatus, comprising:
a processor; and
a memory that stores executable instructions that, when executed by the processor, facilitate performance of operations, comprising:
facilitating a display of an updatable wallpaper comprising a theme personalized to a user identity associated with the apparatus, wherein the facilitating the display comprises facilitating the display of content of a message from a contact via the display of the updatable wallpaper, wherein the display of the updatable wallpaper comprises the display of the message dictated by the theme, and wherein levels of detail of the content are based on a day the message was received;
determining a day of receipt of the message;
comparing the day of receipt of the message to a preference for privacy, wherein levels of detail of the content are based on day of receipt of the message and a result of the comparing with the preference for privacy;
displaying a first level of detail of the levels of detail based on a first day of receipt of the message and the comparing or displaying a second level of detail of the levels of detail based on a second day of receipt of the message different than the first day of receipt and the comparing, and wherein the levels of detail of the content being displayed enable differing levels of the privacy of the content.

11. The apparatus of claim 10, wherein the facilitating the display of the content is based on detected activity of the contact.

12. The apparatus of claim 11, wherein the detected activity is a detected social network activity of the contact.

13. The apparatus of claim 10, wherein the operations further comprise updating the updatable wallpaper to display an activity of an animated icon displayed as part of the updatable wallpaper.

14. The apparatus of claim 13, wherein the theme comprises animated icons, comprising the animated icon displayed as part of the updatable wallpaper, moving according to a defined trajectory.

15. The apparatus of claim 10, wherein the updatable wallpaper further comprises an icon activatable to display weather information on the updatable wallpaper.

16. The apparatus of claim 10, wherein the operations further comprise facilitating displaying information associated with the contact via a widget on the updatable wallpaper.

17. A non-transitory machine-readable storage medium, comprising executable instructions that, when executed by a processor, facilitate performance of operations, comprising:
determining content of a body of a message from a contact; and
facilitating a display of an updatable wallpaper comprising a theme personalized to a user identity associated with the device, wherein the facilitating the display comprises facilitating the display of the content of the body of the message from the contact via the display of the updatable wallpaper, wherein the updatable wallpaper comprises text dictated by the theme, and wherein levels of detail of the content are based on day of receipt of the message;
determining a day of receipt of the message;
comparing the day of receipt of the message to a preference for privacy, wherein levels of detail of the content are based on day of receipt of the message and an outcome of the comparing with the preference for privacy,
displaying a first level of detail of the levels of detail in response to the message being received on a first day of receipt and the comparing, and wherein the levels of detail of the content being displayed provide differing levels of the privacy of the content.

18. The non-transitory machine-readable storage medium of claim 17, wherein the facilitating the display is based on a detected social network activity of the contact.

19. The non-transitory machine-readable storage medium of claim 17, further comprising displaying wherein a second level of detail of the levels of detail in response to the message being received on a second day of receipt and the comparing.

20. The non-transitory machine-readable storage medium of claim 17, wherein the updatable wallpaper further comprises an icon activatable to display weather information on the updatable wallpaper.

\* \* \* \* \*